(12) United States Patent
Benos et al.

(10) Patent No.: US 10,845,184 B2
(45) Date of Patent: *Nov. 24, 2020

(54) SEMI-AUTOMATIC DIMENSIONING WITH IMAGER ON A PORTABLE DEVICE

(71) Applicant: Intermec IP Corporation, Fort Mill, SC (US)

(72) Inventors: Virginie Benos, Dremil Lafage (FR); Vincent Bessettes, Toulouse (FR); Franck Laffargue, Toulouse (FR)

(73) Assignee: INTERMEC IP CORPORATION, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,260

(22) Filed: Oct. 5, 2018

(65) Prior Publication Data

US 2019/0049234 A1 Feb. 14, 2019

Related U.S. Application Data

(63) Continuation of application No. 14/561,367, filed on Dec. 5, 2014, now Pat. No. 10,140,724, which is a
(Continued)

(30) Foreign Application Priority Data

Jan. 12, 2009 (EP) ..................................... 09368001

(51) Int. Cl.
*G01B 11/02* (2006.01)
*G01G 19/00* (2006.01)
(Continued)

(52) U.S. Cl.
CPC ........... *G01B 11/02* (2013.01); *G01G 19/005* (2013.01); *G06F 3/04842* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,971,065 A | 7/1976 | Bayer |
| 4,279,328 A | 7/1981 | Ahlbom |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.

(Continued)

*Primary Examiner* — Tsung Yin Tsai
(74) *Attorney, Agent, or Firm* — Alston & Bird LLP

(57) ABSTRACT

A method of operating a dimensioning system to determine dimensional information for objects is disclosed. A number of images are acquired. Objects in at least one of the acquired images are computationally identified. One object represented in the at least one of the acquired images is computationally initially selected as a candidate for processing. An indication of the initially selected object is provided to a user. At least one user input indicative of an object selected for processing is received. Dimensional data for the object indicated by the received user input is computationally determined.

17 Claims, 11 Drawing Sheets

Related U.S. Application Data continuation of application No. 12/685,816, filed on Jan. 12, 2010, now Pat. No. 8,908,995.

(60) Provisional application No. 61/149,912, filed on Feb. 4, 2009.

(51) Int. Cl.
*G06F 3/0484* (2013.01)
*G06F 3/0488* (2013.01)
*G06T 7/62* (2017.01)

(52) U.S. Cl.
CPC ............ *G06F 3/04883* (2013.01); *G06T 7/62* (2017.01); *G06T 2207/10004* (2013.01); *G06T 2207/10041* (2013.01); *G06T 2207/20104* (2013.01)

(56) References Cited

U.S. PATENT DOCUMENTS

| | | | |
|---|---|---|---|
| 4,398,811 A | 8/1983 | Nishioka et al. | |
| 4,495,559 A | 1/1985 | Gelatt et al. | |
| 4,730,190 A | 3/1988 | Win et al. | |
| 4,803,639 A | 2/1989 | Steele et al. | |
| 5,175,601 A | 12/1992 | Fitts | |
| 5,184,733 A * | 2/1993 | Arnarson | A22C 25/00 177/1 |
| 5,220,536 A | 6/1993 | Stringer et al. | |
| 5,331,118 A | 7/1994 | Jensen | |
| 5,359,185 A | 10/1994 | Hanson | |
| 5,384,901 A | 1/1995 | Glassner et al. | |
| 5,548,707 A | 8/1996 | Lonegro et al. | |
| 5,555,090 A | 9/1996 | Schmutz | |
| 5,561,526 A * | 10/1996 | Huber | G01B 11/2504 356/604 |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | Lonegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,732,147 A | 3/1998 | Tao | |
| 5,734,476 A | 3/1998 | Dlugos | |
| 5,737,074 A | 4/1998 | Haga et al. | |
| 5,767,962 A | 6/1998 | Suzuki et al. | |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | Lonegro et al. | |
| 5,938,710 A | 8/1999 | Lanza et al. | |
| 5,959,568 A | 9/1999 | Woolley | |
| 5,960,098 A | 9/1999 | Tao | |
| 5,969,823 A | 10/1999 | Wurz et al. | |
| 5,978,512 A | 11/1999 | Kim | |
| 5,979,760 A | 11/1999 | Freyman et al. | |
| 5,988,862 A | 11/1999 | Kacyra et al. | |
| 5,991,041 A | 11/1999 | Woodworth | |
| 6,009,189 A * | 12/1999 | Schaack | A61B 1/00147 348/137 |
| 6,025,847 A | 2/2000 | Marks | |
| 6,049,386 A | 4/2000 | Stringer et al. | |
| 6,053,409 A | 4/2000 | Brobst et al. | |
| 6,064,629 A * | 5/2000 | Stringer | G01B 11/00 367/128 |
| 6,064,759 A | 5/2000 | Buckley et al. | |
| 6,067,110 A | 5/2000 | Nonaka et al. | |
| 6,069,696 A | 5/2000 | McQueen et al. | |
| 6,115,114 A * | 9/2000 | Berg | G01B 11/00 177/25.15 |
| 6,137,577 A | 10/2000 | Woodworth | |
| 6,177,999 B1 | 1/2001 | Wurz et al. | |
| 6,189,223 B1 * | 2/2001 | Haug | G01B 11/00 33/1 V |
| 6,232,597 B1 * | 5/2001 | Kley | G02B 21/002 250/234 |
| 6,236,403 B1 | 5/2001 | Chaki et al. | |
| 6,246,468 B1 | 6/2001 | Dimsdale | |
| 6,333,749 B1 | 12/2001 | Reinhardt et al. | |
| 6,336,587 B1 | 1/2002 | He et al. | |
| 6,369,401 B1 | 4/2002 | Lee | |
| 6,373,579 B1 | 4/2002 | Ober et al. | |
| 6,429,803 B1 | 8/2002 | Kumar | |
| 6,457,642 B1 | 10/2002 | Good et al. | |
| 6,507,406 B1 | 1/2003 | Yagi et al. | |
| 6,517,004 B2 | 2/2003 | Good et al. | |
| 6,519,550 B1 | 2/2003 | D et al. | |
| 6,535,776 B1 | 3/2003 | Tobin et al. | |
| 6,661,521 B1 | 12/2003 | Stern | |
| 6,674,904 B1 | 1/2004 | McQueen | |
| 6,705,526 B1 | 3/2004 | Zhu et al. | |
| 6,781,621 B1 | 8/2004 | Gobush et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,922,632 B2 | 7/2005 | Foxlin | |
| 6,971,580 B2 | 12/2005 | Zhu et al. | |
| 6,995,762 B1 | 2/2006 | Pavlidis et al. | |
| 7,057,632 B2 | 6/2006 | Yamawaki et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,137,556 B1 * | 11/2006 | Bonner | B07C 3/14 235/462.08 |
| 7,159,783 B2 | 1/2007 | Walczyk et al. | |
| 7,161,688 B1 | 1/2007 | Bonner et al. | |
| 7,205,529 B2 * | 4/2007 | Andersen | G01B 11/00 250/223 R |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 | 12/2007 | Gokturk et al. | |
| 7,413,127 B2 | 8/2008 | Ehrhart et al. | |
| 7,527,205 B2 | 5/2009 | Zhu et al. | |
| 7,586,049 B2 | 9/2009 | Wurz | |
| 7,602,404 B1 | 10/2009 | Reinhardt et al. | |
| 7,614,563 B1 | 11/2009 | Nunnink et al. | |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,061,610 B2 | 11/2011 | Nunnink | |
| 8,072,581 B1 | 12/2011 | Breiholz | |
| 8,102,395 B2 | 1/2012 | Kondo et al. | |
| 8,132,728 B2 * | 3/2012 | Dwinell | G06T 7/60 235/440 |
| 8,134,717 B2 * | 3/2012 | Pangrazio | G01B 11/00 356/614 |
| 8,149,224 B1 | 4/2012 | Kuo et al. | |
| 8,194,097 B2 | 6/2012 | Xiao et al. | |
| 8,212,889 B2 | 7/2012 | Chanas et al. | |
| 8,228,510 B2 | 7/2012 | Pangrazio et al. | |
| 8,230,367 B2 * | 7/2012 | Bell | G06K 9/00335 715/863 |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu | |

(56) References Cited

U.S. PATENT DOCUMENTS

| | | |
|---|---|---|
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,374,498 B2 | 2/2013 | Pastore |
| 8,376,233 B2 | 2/2013 | Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |

(56) References Cited

U.S. PATENT DOCUMENTS

| | | | |
|---|---|---|---|
| 8,918,250 B2 | 12/2014 | Hollifield | |
| 8,918,564 B2 | 12/2014 | Caballero | |
| 8,925,818 B2 | 1/2015 | Kosecki et al. | |
| 8,939,374 B2 | 1/2015 | Jovanovski et al. | |
| 8,942,480 B2 | 1/2015 | Ellis | |
| 8,944,313 B2 | 2/2015 | Williams et al. | |
| 8,944,327 B2 | 2/2015 | Meier et al. | |
| 8,944,332 B2 | 2/2015 | Harding et al. | |
| 8,950,678 B2 | 2/2015 | Germaine et al. | |
| D723,560 S | 3/2015 | Zhou et al. | |
| 8,967,468 B2 | 3/2015 | Gomez et al. | |
| 8,971,346 B2 | 3/2015 | Sevier | |
| 8,976,030 B2 | 3/2015 | Cunningham et al. | |
| 8,976,368 B2 | 3/2015 | El et al. | |
| 8,978,981 B2 | 3/2015 | Guan | |
| 8,978,983 B2 | 3/2015 | Bremer et al. | |
| 8,978,984 B2 | 3/2015 | Hennick et al. | |
| 8,985,456 B2 | 3/2015 | Zhu et al. | |
| 8,985,457 B2 | 3/2015 | Soule et al. | |
| 8,985,459 B2 | 3/2015 | Kearney et al. | |
| 8,985,461 B2 | 3/2015 | Gelay et al. | |
| 8,988,578 B2 | 3/2015 | Showering | |
| 8,988,590 B2 | 3/2015 | Gillet et al. | |
| 8,991,704 B2 | 3/2015 | Hopper et al. | |
| 8,996,194 B2 | 3/2015 | Davis et al. | |
| 8,996,384 B2 | 3/2015 | Funyak et al. | |
| 8,998,091 B2 | 4/2015 | Edmonds et al. | |
| 9,002,641 B2 | 4/2015 | Showering | |
| 9,007,368 B2 | 4/2015 | Laffargue et al. | |
| 9,010,641 B2 | 4/2015 | Qu et al. | |
| 9,014,441 B2* | 4/2015 | Truyen | A61B 5/1072 382/128 |
| 9,015,513 B2 | 4/2015 | Murawski et al. | |
| 9,016,576 B2 | 4/2015 | Brady et al. | |
| D730,357 S | 5/2015 | Fitch et al. | |
| 9,022,288 B2 | 5/2015 | Nahill et al. | |
| 9,030,964 B2 | 5/2015 | Essinger et al. | |
| 9,033,240 B2 | 5/2015 | Smith et al. | |
| 9,033,242 B2 | 5/2015 | Gillet et al. | |
| 9,036,054 B2 | 5/2015 | Koziol et al. | |
| 9,037,344 B2 | 5/2015 | Chamberlin | |
| 9,038,911 B2 | 5/2015 | Xian et al. | |
| 9,038,915 B2 | 5/2015 | Smith | |
| D730,901 S | 6/2015 | Oberpriller et al. | |
| D730,902 S | 6/2015 | Fitch et al. | |
| D733,112 S | 6/2015 | Chaney et al. | |
| 9,047,098 B2 | 6/2015 | Barten | |
| 9,047,359 B2 | 6/2015 | Caballero et al. | |
| 9,047,420 B2 | 6/2015 | Caballero | |
| 9,047,525 B2 | 6/2015 | Barber et al. | |
| 9,047,531 B2 | 6/2015 | Showering et al. | |
| 9,049,640 B2 | 6/2015 | Wang et al. | |
| 9,053,055 B2 | 6/2015 | Caballero | |
| 9,053,378 B1 | 6/2015 | Hou et al. | |
| 9,053,380 B2 | 6/2015 | Xian et al. | |
| 9,057,641 B2 | 6/2015 | Amundsen et al. | |
| 9,058,526 B2 | 6/2015 | Powilleit | |
| 9,064,165 B2 | 6/2015 | Havens et al. | |
| 9,064,167 B2 | 6/2015 | Xian et al. | |
| 9,064,168 B2 | 6/2015 | Todeschini et al. | |
| 9,064,254 B2 | 6/2015 | Todeschini et al. | |
| 9,066,032 B2 | 6/2015 | Wang | |
| 9,070,032 B2 | 6/2015 | Corcoran | |
| D734,339 S | 7/2015 | Zhou et al. | |
| D734,751 S | 7/2015 | Oberpriller et al. | |
| 9,082,023 B2 | 7/2015 | Feng et al. | |
| 9,082,195 B2 | 7/2015 | Holeva et al. | |
| 9,142,035 B1 | 9/2015 | Rotman et al. | |
| 9,233,470 B1 | 1/2016 | Bradski et al. | |
| 9,239,950 B2* | 1/2016 | Fletcher | G06K 9/00375 |
| 9,299,013 B1 | 3/2016 | Curlander et al. | |
| 9,424,749 B1 | 8/2016 | Reed et al. | |
| 9,486,921 B1 | 11/2016 | Straszheim et al. | |
| 9,828,223 B2 | 11/2017 | Svensson et al. | |
| 10,339,352 B2* | 7/2019 | Ackley | G06Q 10/08 |
| 2001/0027995 A1 | 10/2001 | Patel et al. | |
| 2001/0032879 A1 | 10/2001 | He et al. | |
| 2002/0036765 A1 | 3/2002 | McCaffrey et al. | |
| 2002/0054289 A1 | 5/2002 | Thibault et al. | |
| 2002/0067855 A1 | 6/2002 | Chiu et al. | |
| 2002/0105639 A1 | 8/2002 | Roelke | |
| 2002/0109835 A1 | 8/2002 | Goetz | |
| 2002/0113946 A1 | 8/2002 | Kitaguchi et al. | |
| 2002/0118874 A1* | 8/2002 | Chung | G06T 17/10 382/154 |
| 2002/0158873 A1 | 10/2002 | Williamson | |
| 2002/0167677 A1 | 11/2002 | Okada et al. | |
| 2002/0179708 A1 | 12/2002 | Zhu et al. | |
| 2002/0196534 A1 | 12/2002 | Lizotte et al. | |
| 2003/0038179 A1 | 2/2003 | Tsikos et al. | |
| 2003/0053513 A1 | 3/2003 | Vatan et al. | |
| 2003/0063086 A1 | 4/2003 | Baumberg | |
| 2003/0091227 A1 | 5/2003 | Chang et al. | |
| 2003/0156756 A1 | 8/2003 | Gokturk et al. | |
| 2003/0197138 A1 | 10/2003 | Pease et al. | |
| 2003/0225712 A1 | 12/2003 | Cooper et al. | |
| 2003/0235331 A1 | 12/2003 | Kawaike et al. | |
| 2004/0008259 A1 | 1/2004 | Gokturk et al. | |
| 2004/0019274 A1 | 1/2004 | Galloway et al. | |
| 2004/0024754 A1 | 2/2004 | Mane et al. | |
| 2004/0066329 A1 | 4/2004 | Zeitfuss et al. | |
| 2004/0073359 A1 | 4/2004 | Ichijo et al. | |
| 2004/0083025 A1 | 4/2004 | Yamanouchi et al. | |
| 2004/0089482 A1 | 5/2004 | Ramsden et al. | |
| 2004/0098146 A1 | 5/2004 | Katae et al. | |
| 2004/0105580 A1 | 6/2004 | Hager et al. | |
| 2004/0118928 A1 | 6/2004 | Patel et al. | |
| 2004/0132297 A1 | 7/2004 | Baba et al. | |
| 2004/0155975 A1 | 8/2004 | Hart et al. | |
| 2004/0165090 A1 | 8/2004 | Ning | |
| 2004/0184041 A1 | 9/2004 | Schopp | |
| 2004/0211836 A1 | 10/2004 | Patel et al. | |
| 2004/0214623 A1 | 10/2004 | Takahashi et al. | |
| 2004/0233461 A1* | 11/2004 | Armstrong | G01C 11/025 356/620 |
| 2004/0258353 A1 | 12/2004 | Gluckstad et al. | |
| 2005/0006477 A1 | 1/2005 | Patel | |
| 2005/0117215 A1 | 6/2005 | Lange | |
| 2005/0128193 A1 | 6/2005 | Lueder | |
| 2005/0128196 A1 | 6/2005 | Popescu et al. | |
| 2005/0168488 A1* | 8/2005 | Montague | G06F 3/04845 345/659 |
| 2005/0211782 A1 | 9/2005 | Martin et al. | |
| 2005/0257748 A1 | 11/2005 | Kriesel et al. | |
| 2005/0264867 A1 | 12/2005 | Cho et al. | |
| 2006/0047704 A1 | 3/2006 | Gopalakrishnan | |
| 2006/0078226 A1 | 4/2006 | Zhou | |
| 2006/0108266 A1 | 5/2006 | Bowers et al. | |
| 2006/0109105 A1 | 5/2006 | Varner et al. | |
| 2006/0112023 A1 | 5/2006 | Horhann et al. | |
| 2006/0151604 A1 | 7/2006 | Zhu et al. | |
| 2006/0159307 A1 | 7/2006 | Anderson et al. | |
| 2006/0159344 A1 | 7/2006 | Shao | |
| 2006/0232681 A1 | 10/2006 | Okada | |
| 2006/0255150 A1 | 11/2006 | Longacre, Jr. | |
| 2006/0269165 A1 | 11/2006 | Viswanathan | |
| 2006/0276709 A1 | 12/2006 | Khamene et al. | |
| 2006/0291719 A1 | 12/2006 | Ikeda et al. | |
| 2007/0003154 A1 | 1/2007 | Sun et al. | |
| 2007/0025612 A1 | 2/2007 | Iwasaki et al. | |
| 2007/0031064 A1 | 2/2007 | Zhao et al. | |
| 2007/0063048 A1 | 3/2007 | Havens et al. | |
| 2007/0116357 A1* | 5/2007 | Dewaele | G06T 7/60 382/173 |
| 2007/0127022 A1 | 6/2007 | Cohen et al. | |
| 2007/0143082 A1 | 6/2007 | Degnan | |
| 2007/0153293 A1 | 7/2007 | Gruhlke et al. | |
| 2007/0171220 A1 | 7/2007 | Kriveshko | |
| 2007/0177011 A1 | 8/2007 | Lewin et al. | |
| 2007/0181685 A1 | 8/2007 | Zhu et al. | |
| 2007/0237356 A1* | 10/2007 | Dwinell | B07C 3/14 382/101 |
| 2007/0291031 A1 | 12/2007 | Konev et al. | |
| 2007/0299338 A1 | 12/2007 | Stevick et al. | |

(56) References Cited

U.S. PATENT DOCUMENTS

| | | |
|---|---|---|
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0056536 A1 | 3/2008 | Hildreth et al. |
| 2008/0062164 A1 | 3/2008 | Bassi et al. |
| 2008/0077265 A1 | 3/2008 | Boyden et al. |
| 2008/0164074 A1 | 7/2008 | Wurz |
| 2008/0204476 A1* | 8/2008 | Montague ............ G06F 3/04845 345/661 |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler et al. |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1* | 12/2009 | Valkenburg .......... G01B 11/002 358/1.18 |
| 2010/0035637 A1 | 2/2010 | Varanasi et al. |
| 2010/0060604 A1 | 3/2010 | Zwart et al. |
| 2010/0091104 A1* | 4/2010 | Sprigle ................ A61B 5/0059 348/136 |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1* | 8/2010 | Benos .................... G01B 11/02 382/200 |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220894 A1 | 9/2010 | Ackley et al. |
| 2010/0223276 A1 | 9/2010 | Al-Shameri et al. |
| 2010/0254611 A1 | 10/2010 | Arnz |
| 2010/0274728 A1 | 10/2010 | Kugelman |
| 2010/0303336 A1 | 12/2010 | Abraham et al. |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim et al. |
| 2011/0043609 A1 | 2/2011 | Choi et al. |
| 2011/0075936 A1 | 3/2011 | Deaver |
| 2011/0081044 A1 | 4/2011 | Peeper et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman et al. |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1* | 12/2011 | Konertz ................ G06T 19/006 348/46 |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0201288 A1 | 8/2012 | Kolze et al. |
| 2012/0203647 A1 | 8/2012 | Smith |
| 2012/0218436 A1 | 8/2012 | Rhoads et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236288 A1 | 9/2012 | Stanley |
| 2012/0242852 A1 | 9/2012 | Hayward et al. |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta et al. |
| 2012/0314058 A1 | 12/2012 | Bendall et al. |
| 2012/0316820 A1 | 12/2012 | Nakazato et al. |
| 2013/0019278 A1* | 1/2013 | Sun ........................ G06F 21/36 726/2 |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0076857 A1* | 3/2013 | Kurashige ............... G03H 1/32 348/40 |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |

(56) References Cited

U.S. PATENT DOCUMENTS

| | | |
|---|---|---|
| 2013/0313325 A1 | 11/2013 | Wilz et al. |
| 2013/0329012 A1 | 12/2013 | Bartos et al. |
| 2013/0329013 A1 | 12/2013 | Metois et al. |
| 2013/0342342 A1 | 12/2013 | Sabre et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein, Jr. |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0062709 A1* | 3/2014 | Hyer ................. G01G 11/00 340/679 |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0091147 A1 | 4/2014 | Evans |
| 2014/0097238 A1 | 4/2014 | Ghazizadeh |
| 2014/0098091 A1* | 4/2014 | Hori .................. G06T 7/62 345/419 |
| 2014/0098243 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0205150 A1* | 7/2014 | Ogawa ................. G01B 11/002 382/106 |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Hirata et al. |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0347533 A1 | 11/2014 | Toyoda |
| 2014/0350710 A1 | 11/2014 | Gopalakrishnan et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |

(56) References Cited

U.S. PATENT DOCUMENTS

| | | |
|---|---|---|
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1* | 3/2015 | Lloyd .................. G06K 9/6267 382/141 |
| 2015/0069130 A1 | 3/2015 | Gannon |
| 2015/0070158 A1 | 3/2015 | Hayasaka |
| 2015/0071818 A1 | 3/2015 | Scheuren et al. |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0117749 A1 | 4/2015 | Smith et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos |
| 2015/0161429 A1 | 6/2015 | Xian |
| 2015/0163474 A1 | 6/2015 | You |
| 2015/0169925 A1 | 6/2015 | Chen et al. |
| 2015/0169929 A1 | 6/2015 | Williams et al. |
| 2015/0178900 A1 | 6/2015 | Kim et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0201181 A1 | 7/2015 | Moore et al. |
| 2015/0204662 A1 | 7/2015 | Kobayashi et al. |
| 2015/0204671 A1 | 7/2015 | Showering |
| 2015/0213647 A1 | 7/2015 | Laffargue et al. |
| 2015/0219748 A1 | 8/2015 | Hyatt et al. |
| 2015/0229838 A1 | 8/2015 | Hakim et al. |
| 2015/0269403 A1 | 9/2015 | Lei et al. |
| 2015/0276379 A1* | 10/2015 | Ni ........................ G01B 11/022 382/154 |
| 2015/0308816 A1 | 10/2015 | Laffargue |
| 2015/0316368 A1 | 11/2015 | Moench et al. |
| 2015/0325036 A1 | 11/2015 | Lee |
| 2015/0332463 A1 | 11/2015 | Galera et al. |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0065912 A1 | 3/2016 | Peterson |
| 2016/0090283 A1 | 3/2016 | Svensson et al. |
| 2016/0090284 A1 | 3/2016 | Svensson et al. |
| 2016/0138247 A1 | 5/2016 | Conway et al. |
| 2016/0138248 A1 | 5/2016 | Conway et al. |
| 2016/0138249 A1 | 5/2016 | Conway et al. |
| 2016/0169665 A1 | 6/2016 | Deschenes et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0203641 A1 | 7/2016 | Bostick et al. |
| 2016/0223474 A1 | 8/2016 | Tang et al. |
| 2017/0115490 A1 | 4/2017 | Hsieh et al. |
| 2017/0121158 A1 | 5/2017 | Wong et al. |
| 2017/0182942 A1 | 6/2017 | Hardy et al. |
| 2017/0336870 A1 | 11/2017 | Everett et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 1112483 B1 | 5/2006 |
| EP | 1232480 B1 | 5/2006 |
| EP | 2013117 A1 | 1/2009 |
| EP | 2286932 A2 | 2/2011 |
| EP | 2372648 A2 | 10/2011 |
| EP | 2381421 A2 | 10/2011 |
| EP | 2533009 A2 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 4/2016 |
| EP | 3007096 A1 | 4/2016 |
| EP | 3012601 A1 | 4/2016 |
| GB | 2525053 A | 10/2015 |
| GB | 2531928 A | 5/2016 |
| JP | 04-129902 A | 4/1992 |
| JP | 2006-096457 A | 4/2006 |
| JP | 2007-084162 A | 4/2007 |
| JP | 2008-210276 A | 9/2008 |
| JP | 2014-210646 A | 11/2014 |
| JP | 2015-174705 A | 10/2015 |
| KR | 10-2010-0020115 A | 2/2010 |
| KR | 10-2011-0013200 A | 2/2011 |
| KR | 10-2011-0117020 A | 10/2011 |
| KR | 10-2012-0028109 A | 3/2012 |
| WO | 96/40452 A1 | 12/1996 |
| WO | 00/77726 A1 | 12/2000 |
| WO | 01/14836 A1 | 3/2001 |
| WO | 20061095110 A1 | 9/2006 |
| WO | 2007/012554 A1 | 2/2007 |
| WO | 2007/015059 A1 | 2/2007 |
| WO | 2007/125554 A1 | 11/2007 |
| WO | 2011/017241 A1 | 2/2011 |
| WO | 2012/175731 A1 | 12/2012 |
| WO | 2013/021157 A1 | 2/2013 |
| WO | 2013/033442 A1 | 3/2013 |
| WO | 2013/163789 A1 | 11/2013 |
| WO | 2013/166368 A1 | 11/2013 |
| WO | 2013/173985 A1 | 11/2013 |
| WO | 2013/184340 A1 | 12/2013 |
| WO | 2014/019130 A1 | 2/2014 |
| WO | 2014/102341 A1 | 7/2014 |
| WO | 2014/110495 A2 | 7/2014 |
| WO | 2014/149702 A1 | 9/2014 |
| WO | 2014/151746 A2 | 9/2014 |
| WO | 2015/006865 A1 | 1/2015 |

(56) References Cited

FOREIGN PATENT DOCUMENTS

| | | |
|---|---|---|
| WO | 2016/020038 A1 | 2/2016 |
| WO | 2016/061699 A1 | 4/2016 |

OTHER PUBLICATIONS

YUV to RGB Conversion, downloaded from http://www.fource.org/fccyvrgb.php on Jun. 29, 2012; 5 pages.
YUV Pixel Formal, downloaded from http://www.fource.org/yuv.php on Jun. 29, 2012; 13 pages.
Wikipedia, YUV description and definition, downloaded from http://www.wikipeida.org/wiki/YUV on Jun. 29, 2012, 10 pages.
Wikipedia, "Microlens", Downloaded from https://en.wikipedia.org/wiki/Microlens, pp. 3. {In Feb. 9, 2017 Final Office Action in related matter}.
Wikipedia, "3D projection" Downloaded on Nov. 25, 2015 from www.wikipedia.com, 4 pages.
Ward, Benjamin, Interactive 3D Reconstruction from Video, Aug. 2012, Doctoral Thesis, Univesity of Adelaide, Adelaide, South Australia, 157 pages.
United Kingdom Search Report in related Application No. GB1700338.5, dated Jun. 30, 2017, 5 pages.
United Kingdom Search Report in related application GB1517842.9, dated Apr. 8, 2016, 8 pages.
United Kingdom Further Examination Report in related GB Patent Application No. 1620676.5 dated Jul. 17, 2018; 4 pages [no art cited].
United Kingdom Further Examination Report in related GB Patent Application No. 1517842.9 dated Jul. 26, 2018; 5 pages [Cited art has been previously cited in this matter].
United Kingdom Further Examination Report in related GB Patent Application No. 1517112.7 dated Jul. 17, 2018; 4 pages [no art cited].
United Kingdom combined Search and Examination Report in related GB Application No. 1607394.2, dated Oct. 19, 2016, 7 pages.
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
United Kingdom Combined Search and Examination Report dated Mar. 21, 2018, 5 pages (Art has been previously cited).
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017].
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
UK Further Exam Report in related UK Application No. GB1517842.9, dated Sep. 1, 2017, 5 pages (only new art cited herein).
U.S. Patent Application, Franck Laffargue et al., filed Oct. 21, 2014, not published yet. Handheld Dimensioner With Data-Quality Indication; 34 pages, U.S. Appl. No. 14/519,233.
U.S. Patent Application Tyler Doomenbal et al., filed Jul. 16, 2015, not published yet, Adjusting Dimensioning Results Using Augmented Reality, 39 pages, U.S. Appl. No. 14/801,023.
U.S. Patent Application Serge Thuries et al., filed Jun. 23, 2015, not published yet, Optical Pattern Projector; 33 pages, U.S. Appl. No. 14/747,197.
U.S. Appl. No. 29/530,600 for Cyclone filed Jun. 18, 2015 (Vargo et al); 16 pages.
U.S. Appl. No. 29/529,441 for Indicia Reading Device filed Jun. 8, 2015 (Zhou et al.); 14 pages.
U.S. Appl. No. 29/528,890 for Mobile Computer Housing filed Jun. 2, 2015 (Filch et al.); 61 pages.
U.S. Appl. No. 29/528,590 for Electronic Device filed May 29, 2015 (Fitch et al.); 9 pages.
U.S. Appl. No. 29/528,165 for In-Counter Barcode Scanner filed May 27, 2015 (Oberpriller et al.); 13 pages.
U.S. Appl. No. 29/526,918 for Charging Base filed May 14, 2015 (Fitch et al.); 10 pages.
U.S. Appl. No. 29/525,068 for Tablet Computer With Removable Scanning Device filed Apr. 27, 2015 (Schulte et al.); 19 pages.
U.S. Appl. No. 29/524,186 for Scanner filed Apr. 17, 2015 (Zhou et al.); 17 pages.
U.S. Appl. No. 29/523,098 for Handle for a Tablet Computer filed Apr. 7, 2015 (Bidwell et al.); 17 pages.
U.S. Appl. No. 29/519,017 for Scanner filed Mar. 2, 2015 (Zhou et al.); 11 pages.
U.S. Appl. No. 29/516,892 for Table Computer filed Feb. 6, 2015 (Bidwell et al.); 13 pages.
U.S. Appl. No. 29/468,118 for an Electronic Device Case, filed Sep. 26, 2013 (Oberpriller et al.); 44 pages.
U.S. Appl. No. 29/459,620 for an Electronic Device Enclosure, filed Jul. 2, 2013 (London et al.); 21 pages.
U.S. Appl. No. 29/458,405 for an Electronic Device, filed Jun. 19, 2013 (Fitch et al.); 22 pages.
U.S. Appl. No. 14/795,332, Franke Laffargue et al., filed Jul. 9, 2015, not published yet, Systems and Methods for Enhancing Dimensioning; 55 pages.
U.S. Appl. Bo. 14/748,446 for Cordless Indicia Reader With a Multifunction Coil for Wireless Charging and Eas Deactivation, filed Jun. 24, 2015 (Xie et al.); 34 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/740,320 for Tactile Switch for a Mobile Electronic Device filed Jun. 16, 2015 (Barndringa); 38 pages.
U.S. Appl. No. 14/735,717 for Indicia-Reading Systems Having an Interface With a User'S Nervous System filed Jun. 10, 2015 (Todeschini); 39 pages.
U.S. Appl. No. 14/715,672 for Augumented Reality Enabled Hazard Display filed May 19, 2015 (Venkatesha et al.); 35 pages.
U.S. Appl. No. 14/707,123 for Application Independent DEX/UCS Interface filed May 8, 2015 (Pape); 47 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/705,012 for Hands-Free Human Machine Interface Responsive to a Driver of a Vehicle filed May 6, 2015 (Filch et al.); 44 pages.
U.S. Appl. No. 14/704,050 for Intermediate Linear Positioning filed May 5, 2015 (Charpentier et al.); 60 pages.
U.S. Appl. No. 14/702,979 for Tracking Battery Conditions filed May 4, 2015 (Young et al.); 70 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/695,923 for Secure Unattended Network Authentication filed Apr. 24, 2015 (Kubler et al.); 52 pages.
U.S. Appl. No. 14/695,364 for Medication Management System filed Apr. 24, 2015 (Sewell et al.); 44 pages.
U.S. Appl. No. 14/687,289 for System for Communication Via a Peripheral Hub filed Apr. 15, 2015 (Kohtz et al.); 37 pages.
European Search Report for related Application EP 15190249.1, dated Mar. 22, 2016, 7 pages.
European Search Report for application No. EP13186043 dated Feb. 26, 2014 (now EP2722656 (Apr. 23, 2014)): Total pp. 7.
European Patent Search Report for Application No. 14157971.4-1906, dated Jun. 30, 2014, 6 pages.
European Patent Office Action for Application No. 14157971.4-1906, dated Jul. 16, 2014, 5 pages.
European Partial Search Report for related EP Application No. 15190306.9, dated May 6, 2016, 8 pages.
European Office Action for application EP 13186043, dated Jun. 12, 2014(now EP2722656 (Apr. 23, 2014)), Total of 6 pages.
European Extended Search Report in related EP Application No. 17201794.9, dated Mar. 16, 2018, 10 pages [Only new art cited herein].

(56) References Cited

OTHER PUBLICATIONS

European Extended Search Report in related EP Application No. 16190017.0, dated Jan. 4, 2017, 6 pages.
European Extended Search Report in related EP Application No. 16173429.8, dated Dec. 1,2016, 8 pages [Only new references cited: US 2013/0038881 was previously cited].
European Extended search report in related EP Application No. 15190306.9, dated Sep. 9, 2016,15 pages [only new references are cited; remaining references were cited with partial search report in same application dated May 6, 2016].
European Extended Search Report in related EP Application 17205030.4, dated Mar. 22, 2018, 8 pages.
European extended search report in related EP Application 16190833.0, dated Mar. 9,2017, 8 pages [only new art has been cited; US Publication 2014/0034731 was previously cited].
European extended Search report in related EP Application 13785171.3, dated Sep. 19, 2016, 8 pages.
European extended Search Report in related Application No. 17207882.6 dated Apr. 26, 2018, 10 pages.
European Examination report in related EP Application No. 14181437.6, dated Feb. 8, 2017, 5 pages [References have been previously cited].
European Exam Report in related EP Application No. 16152477.2, dated Jun. 20, 2017,4 pages [No art to be cited].
European Exam Report in related EP Application No. 15188440.0, dated Apr. 21, 2017,4 pages [No new art to cite].
European Exam Report in related EP Application No. 15176943.7, dated Apr. 12, 2017, 6 pages [Art previously cited in this matter].
European Exam Report in related EP Application 16172995.9, dated Mar. 15, 2018, 7 pages (Only new art cited herein).
European Exam Report in related EP Application 16172995.9, dated Jul. 6,2017, 9 pages [No new art to be cited].
European Exam Report in related , EP Application No. 16168216.6, dated Feb. 27,2017, 5 pages, [References have been previously cited; WO20111017241 and US 2014/0104413].
EP Search Report in related EP Application No. 17171844 dated Sep. 18, 2017.4 pages [Only new art cited herein].
EP Search and Written Opinion Report in related matter EP Application No. 14181437.3, dated Mar. 25, 2015, 7 pages.
EP Extended Search Report in related EP Application No. 171714843.7 dated Oct. 17, 2017, 5 pages {Only new art cited herein}.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Techniique", Retrieved from the Internet: URL: https://www.researchgate.net/profile/Sabry_E1-Hakim/Publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
EKSMA Optics, NPL in Advisory Action dated Apr. 12, 2017 in related commonly owned application, downloaded from http://eksmaoptics.com/optical-systems/f-theta-lenses/f-theta-lens-for-1064-nm/, 2 pages.
Eextended European search report in related EP Application 16199707.7, dated Apr. 10, 2017,15 pages.
Drummond, Tom; Roberto Cipolla, Real-Time Visual Tracking of Complex Structures, Jul. 2002, IEEE Transactions on Pattern Analysis and Machine Intelligence, vol. 24, No.7; 15 pages.
Dimensional Weight—Wikipedia, the Free Encyclopedia, URL= http://en.wikipedia.org/wiki/Dimensional_weight, download date Aug. 1, 2008, 2 pages.
Decision to Grant in counterpart European Application No. 14157971.4 dated Aug. 6, 2015, pp. 1-2.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
Chinese Notice of Reexamination in related Chinese Application 201520810313.3, dated Mar. 14, 2017, English Computer Translation provided, 7 pages [No new art cited].
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Benos et al., "Semi-Automatic Dimensioning with Imager on a Portable Device," U.S. Provisional Patent Application filed Feb. 4, 2009., U.S. Appl. No. 61/419,912.
U.S. Appl. No. 13/367,978, filed Feb. 7, 2012, (Feng et al.); now abandoned.
U. S. Patent Application H. Sprague Ackley et al., Automatic Mode Switching in a Volumer; Dimensioner, not yet published, Filed Jun. 15, 2016, 53 pages, U.S. Appl. No. 15/182,636.
Todeschini et al.; "Depth Sensor Based Auto-Focus System for an Indicia Scanner," U.S. Appl. No. 14/872,176, filed Oct. 1, 2015, 44 pages, not yet published.
Thorlabs, NPL in Advisory Action dated Apr. 12,2017 in related commonly owned application, downloaded from https://www.thorlabs.com/newgrouppage9.cfm?objectgroup_id=6430,4 pages.
Theodoropoulos, Gabriel; "Using Gesture Recognizers to Handle Pinch, Rotate, Pan, Swipe, and Tap Gestures" dated Aug. 25,2014, 34 pages, [Art in Office Action dated Jan. 20, 2017 in related Application.].
Spiller, Jonathan; Object Localization Using Deformable Templates, Master's Dissertation, University of the Witwatersrand, Johannesburg, South Africa, 2007; 74 pages.
Sill Optics, NPL in Advisory Action dated Apr. 12, 2017 in related commonly owned application, http://www.silloptics.de/1/products/sill-encyclopedia/laser-optics/f-theta-lenses/, 4 pages.
Second Chinese Office Action in related CN Application No. 2015220810562.2, dated Mar. 22, 2016, 5 pages. English Translation provided [No references].
Second Chinese Office Action in related CN Application No. 201520810685.6, dated Mar. 22, 2016, 5 pages, no. references.
Second Chinese Office Action in related CN Application No. 201520810313.3, dated Mar. 22, 2016, 5 pages. English Translation provided [No references].
Search Report in counterpart European Application No. 15182675.7, dated Dec. 4, 2015, 10 pages.
Search Report and Opinion in related GB Application No. 1517112.7, dated Feb. 19, 2016, 6 pages (GB2503978 is a commonly now abandoned application and not cited above).
Search Report and Opinion in Related EP Application 15176943.7, dated Jan. 8, 2016, 8 pages, (US Application 2014/0049635 has been previously cited).
Salvi, Joaquim et al. "Pattern Codification Strategies in Structured Light Systems" published in Pattern Recognition; The Journal of the Pattern Recognition Society, Accepted Oct. 2, 2003; 23 pages.
Reisner-Kollmann,lrene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Ralph Grabowski, "Smothing 3D Mesh Objects," New Commands in AutoCAD 2010: Part 11, Art in related matter Non Final Office Action dated May 19, 2017; 6 pages.
Proesmans, Marc et al. "Active Acquisition of 3D Shape for Moving Objects" 0-7803-3258-X/96 1996 IEEE; 4 pages.
Peter Clarke, Actuator Developer Claims Anti-Shake Breakthrough for Smartphone Cams, Electronic Engineering Times, p. 24, May 16, 2011.
Padzensky, Ron; "Augmera; Gesture Control", dated Apr. 18, 2015,15 pages [Cited Art in Office Action dated Jan. 20, 2017 in related Application].
Office Action in counterpart European Application No. 13186043.9 dated Sep. 30, 2015, pp. 1-7.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Mike Stensvold, "get the Most Out of Variable Aperture Lenses", published on www.OutdoorPhotogrpaher.com; dated Dec. 7, 2010;

(56) References Cited

OTHER PUBLICATIONS 4 pages, [As noted on search report retrieved from URL: http://www.outdoorphotographer.com/gear/lenses/get-the-most-out-ofvariable-aperture-lenses.html on Feb. 9, 2016].
McCloskey et al., "Methods for Improving the Accuracy of Dimensioning-System Measurements," U.S. Appl. No. 14/873,613, filed Sep. 2, 2015, 47 pages, not yet published.
McCloskey et al., "Image Transformation for Indicia Reading," U.S. Appl. No. 14/982,032, filed Oct. 30, J015, 48 pages, not yet published.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Cited Art in related US matter with Notice of Allowance dated Aug. 11, 2016].
Lloyd et al., "System for Monitoring the Condition of Packages Throughout Transit", U.S. Appl. No. 14/865,575, filed Sep. 25, 2015, 59 pages, not yet published.
Leotta, Matthew, Generic, Deformable Models for 3-D Vehicle Surveillance, May 2010, Doctoral Dissertation, Brown University, Providence RI, 248 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Kazantsev, Aleksei et al. "Robust Pseudo-Random Coded Colored STructured Light Techniques for 3D Object Model Recovery"; Rose 2008 IEEE International Workshop on Robotic and Sensors Environments (Oct. 17-18, 2008) , 6 pages.
Jovanovski et al., "Image-Stitching for Dimensioning", U.S. Appl. No. 14/870,488, filed Sep. 30, 2015, 45 pages, not yet published.
James Chamberlin, "System and Method for Picking Validation", U.S. Appl. No. 14/865,797, filed Sep. 25, 2015, 44 pages, not yet published.
International Search Report for PCT/US2013/039438 (WO2013166368), dated Oct. 1, 2013, 7 pages.
Intention to Grant in counterpart European Application No. 14157971.4 dated Apr. 14, 2015, pp. 1-8.
Hood, Frederick W; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn. edu/cis_reports/736, Accessed May 31, 2015, 157 pages.
Great Britain Search Report for related Application On. GB1517843.7, dated Feb. 23, 2016; 8 pages.
Grabowski, Ralph; "New Commands in AutoCADs 2010: Part 11 Smoothing 3D Mesh Objects" Dated 2011, 6 pages, [Cited Art in Office Action dated Jan. 20. 2017 in related Application].
Fukaya et al., "Characteristics of Speckle Random Pattern and Its Applications", pp. 317-327, Nouv. Rev. Optique, .6, n. 6. (1975) {Feb. 9, 2017 Final Office Action in related matter: downloaded Mar. 2, 20/17 from http://iopscience.iop.org}.
Extended European Search report in related EP Application No. 17190323.0 dated Jan. 19, 2018; 6 pages [Only new art cited herein].
Extended European Search report in related EP Application No. 17189496.7 dated Dec. 5, 2017; 9 pages.
Extended European Search Report in related EP Application No. 16175410.0, dated Dec. 13, 2016, 5 pages.
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
European Search Report in related EP Application No. 17175357.7, dated Aug. 17, 2017, pp. 1-7 [No new art to be cited].
European Search Report in related EP Application No. 15190315.0, dated Apr. 1, 2016, 7 pages [Commonly owned Reference 2014/0104416 has been previously cited].
European Search Report from related EP Application No. 16168216.6, dated Oct. 20, 2016, 8 pages [New reference cited above; U.S. Publication 2014/0104413 has been previously cited].
European Search Report for related EP Application No. 16152477.2, dated May 24,2016, 8 pages [New Reference cited herein; Reference DE102007037282 A1 and its US Counterparts have been previously cited.].
European Search Report for Related EP Application No. 15189214.8, dated Mar. 3, 2016, 9 pages.
European Search Report for related EP Application No. 15188440.0, dated Mar. 8,2016, 8 pages.
U.S. Appl. No. 14/676,327 for Device Management Proxy for Secure Devices filed Apr. 1, 2015 (Yeakley et al.); 50 pages.
U.S. Appl. No. 14/674,329 for Aimer for Barcode Scanning filed Mar. 31, 2015 (Bidwell); 36 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/662,922 for Multifunction Point of Sale System filed Mar. 19, 2015 (Van Horn et al.); 41 pages.
U.S. Appl. No. 14/628,708 for Device, System, and Method for Determining the Status of Checkout Lanes filed Feb. 23, 2015 (Todeschini); 37 pages.
U.S. Appl. No. 14/619,093 for Methods for Training a Speech Recognition System filed Feb. 11, 2015 (Pecorari); 35 pages.
U.S. Appl. No. 14/614,796 for Cargo Apportionment Techniques filed Feb. 5, 2015 (Morton et al.); 56 pages.
U.S. Appl. No. 14/614,706 for Device for Supporting an Electronic Tool on a User's Hand filed Feb. 5, 2015 (Oberpriller et al.); 33 pages.
U.S. Appl. No. 14/596,757 for System and Method for Detecting Barcode Printing Errors tiled Jan. 14, 2015 (Ackley); 41 pages.
U.S. Appl. No. 14/590,024 for Shelving and Package Locating Systems for Delivery Vehicles filed Jan. 6, 2015 (Payne); 31 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/568,305 for Auto-Contrast Viewfinder for an Indicia Reader filed Dec. 12, 2014 (Todeschini); 29 pages.
U.S. Appl. No. 14/535,764 for Concatenated Expected Responses for Speech Recognition filed Nov. 7, 2014 (Braho et al.); 51 pages.
U.S. Appl. No. 14/533,319 for Barcode Scanning System Using Wearable Device With Embedded Camera filed Nov. 5, 2014 (Todeschini); 29 pages.
U.S. Appl. No. 14/531,154 for Directing an Inspector Through an Inspection filed Nov. 3, 2014 (Miller et al.); 53 pages.
U.S. Appl. No. 14/529,857 for Barcode Reader With Security Features filed Oct. 31, 2014 (Todeschini et al.); 32 pages.
U.S. Appl. No. 14/529,563 for Adaptable Interface for a Mobile Computing Device filed Oct. 31, 2014 (Schoon et al.); 36 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/519,249, H. Sprague Ackley et al., filed Oct. 2, 2014, not published yet. Handheld Dimensioning System With Measurement-Conformance Feedback; 36 pages.
U.S. Appl. No. 14/519,211, H. Sprague Ackley et al., filed Oct. 21, 2014, System and Method for Dimensioning; not published yet. 33 pages.
U.S. Appl. No. 14/519,211 for System and Method for Dimensioning filed Oct. 21, 2014 (Ackley et al.); 33 pages.
U.S. Appl. No. 14/519,195, Franck Laffargue et al., filed Oct. 21, 2014, not published yet. Handheld Dimensioning System With Feedback; 35 pages.

(56) References Cited

OTHER PUBLICATIONS

U.S. Appl. No. 14/519,195 for Handheld Dimensioning System With Feedback filed Oct. 21, 2014 (Laffargue et al.); 39 pages.
U.S. Appl. No. 14/519,179, Serge Thuries et al., filed Oct. 21, 2014, not published yet. Dimensioning System With Multipath Interference Mitigation; 40 pages.
U.S. Appl. No. 14/513,808 for Identifying Inventory Items in a Storage Facility filed Oct. 14, 2014 (Singel et al.); 51 pages.
U.S. Appl. No. 14/483,056 for Variable Depth of Field Barcode Scanner filed Sep. 10, 2014 (McCloskey et al.); 29 pages.
U.S. Appl. No. 14/462,801 for Mobile Computing Device With Data Cognition Software, filed Aug. 19, 2014 (Todeschini et al.); 38 pages.
U.S. Appl. No. 14/461,524, not yet published, filed Aug. 18, 2014, Hand Held Products Inc., System and Method for Package Dimensioning: 21 pages.
U.S. Appl. No. 14/453,019, not yet published, filed Aug. 6, 2014, Hand Held Products Inc., Dimensioning System With Guided Alignment: 31 pages.
U.S. Appl. No. 14/452,697 for Interactive Indicia Reader, filed Aug. 6, 2014, (Todeschini); 32 pages.
U.S. Appl. No. 14/446,391 for Multifunction Point of Sale Apparatus With Optical Signature Capture filed Jul. 30, 2014 (Good et al.); 37 pages.
U.S. Appl. No. 14/405,278 for Design Pattern for Secure Store filed Mar. 9, 2015 (Zhu et al.); 23 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/340,627 for an Axially Reinforced Flexible Scan Element, filed Jul. 25, 2014 (Reublinger et al.); 41 pages.
U.S. Appl. No. 14/334,934 for a System and Method for Indicia Verification, filed Jul. 18, 2014 (Hejl); 38 pages.
U.S. Appl. No. 14/327,827 for a Mobile-Phone Adapter for Electronic Transactions, filed Jul. 10, 2014 (Hejl); 25 pages.
U.S. Appl. No. 14/283,282 for Terminal Having Illumination and Focus Control filed May 21, 2014 (Liu et al.); 31 pages.
U.S. Appl. No. 14/277,337 for Multipurpose Optical Reader, filed May 14, 2014 (Jovanovski et al.); 59 pages.
U.S. Appl. No. 14/264,173 for Autofocus Lens System for Indicia Readers filed Apr. 29, 2014, (Ackley et al.); 39 pages.
U.S. Appl. No. 14/257,364 for Docking System and Method Using Near Field Communication filed Apr. 21, 2014 (Showering); 31 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/200,405 for Indicia Reader for Size-Limited Applications filed Mar. 7, 2014 (Feng et al.); 42 pages.
U.S. Appl. No. 14/055,234, not yet published, Hand Held Products, Inc. filed Oct. 16, 2013; Dimensioning System; 26 pages.
U.S. Appl. No. 13/912,262, not yet published, filed Jun. 7, 2013, Hand Held Products Inc., Method of Error Correction for 3D Imaging Device: 33 pages.
U.S. Patent Application H. Sprague Ackley, filed Jul. 7, 2015, not published yet, Mobile Dimensioner Apparatus for Use in Commerce; 57 pages, U.S. Appl. No. 14/793,149.
U.S. Patent Application H. Sprague Ackley, filed May 19, 2015, not published yet, Evaluating Image Values; 54 pages, U.S. Appl. No. 14/715,916.
U.S. Patent Application H. Sprague Ackley et al., filed Jun. 16, 2015, not published yet, Calibrating a Volume Dimensioner; 63 pages, U.S. Appl. No. 14/740,373.
U.S. Patent Application Eric Todeschini, filed Jul. 16, 2015, not published yet, Dimensioning and Imaging Items, 80 pages, U.S. Appl. No. 14/800,757.
U.S. Appl. No. 14/580,262 for Media Gate for Thermal Transfer Printers filed Dec. 23, 2014 (Bowles); 36 pages.
Advisory Action dated Feb. 5, 2014 for U.S. Appl. No. 12/685,816.
Advisory Action dated Jan. 30, 2018 for U.S. Appl. No. 14/561,367.
Applicant Initiated Interview Summary dated Jun. 30, 2017 for U.S. Appl. No. 14/561,367.
Applicant Initiated Interview Summary dated Mar. 20, 2014 for U.S. Appl. No. 12/685,816.
Examiner initiated interview summary dated Aug. 6, 2014 for U.S. Appl. No. 12/685,816.
Examiner initiated interview summary dated Jul. 7, 2017 for U.S. Appl. No. 14/561,367.
Final Rejection dated Apr. 28, 2017 for U.S. Appl. No. 14/561,367.
Final Rejection dated Nov. 21, 2013 for U.S. Appl. No. 12/685,816.
Final Rejection dated Nov. 24, 2017 for U.S. Appl. No. 14/561,367.
Non-Final Rejection dated Apr. 2, 2018 for U.S. Appl. No. 14/561,367.
Non-Final Rejection dated Feb. 3, 2017 for U.S. Appl. No. 14/561,367.
Non-Final Rejection dated Jan. 9, 2013 for U.S. Appl. No. 12/685,816.
Non-Final Rejection dated Jul. 13, 2017 for U.S. Appl. No. 14/561,367.
Non-Final Rejection dated May 31, 2013 for U.S. Appl. No. 12/685,816.
Notice of Allowance and Fees Due dated Aug. 6, 2014 for U.S. Appl. No. 12/685,816.
Notice of Allowance and Fees Due dated Jul. 13, 2018 for U.S. Appl. No. 14/56,1367.
Requirement for Restriction/Election dated Nov. 15, 2012 for U.S. Appl. No. 12/685,816.
Requirement for Restriction/Election dated Oct. 12, 2016 for U.S. Appl. No. 14/561,367.

\* cited by examiner

SEMI-AUTOMATIC DIMENSIONING WITH IMAGER ON A PORTABLE DEVICE

CROSS-REFERENCE TO RELATED APPLICATIONS

The present application is a continuation of U.S. patent application Ser. No. 14/561,367 for Semi-Automatic Dimensioning with Imager on a Portable Device filed Dec. 5, 2014 (and also published May 28, 2015 as U.S. Patent Application Publication No. 2015/0149946), which is a continuation of U.S. patent application Ser. No. 12/685,816 for Semi-Automatic Dimensioning with Imager on a Portable Device filed Jan. 12, 2010 (and published Aug. 12, 2010 as U.S. Patent Application Publication No. 2010/0202702), now U.S. Pat. No. 8,908,995, which is a non-provisional of U.S. Patent Application No. 61/149,912 for Semi-Automatic Dimensioning with Imager on a Portable Device filed Feb. 4, 2009, U.S. patent application Ser. No. 12/685,816 also claims the benefit of and priority to EP Patent Application No. 09368001.5 for Semi-Automatic Dimensioning with Imager on a Portable Device filed on Jan. 12, 2009. Each of the foregoing patent applications, patent publication, and patent is hereby incorporated by reference in its entirety.

BACKGROUND

Technical Field

This disclosure generally relates to the field of automated package handling.

Description of the Related Art

Package handling efficiency is increased by automating aspects of the process. Two processes that are time consuming are the determination of the package dimensions and/or determining dimensional weight. Package dimensions are important to optimize the loading process. In addition, knowing the remaining space is also useful.

The concept of dimensional weight has commonly been adopted by the transportation industry in most parts of the world as a standard way of determining charges for the shipment of packaged goods. Determining the dimensional weight of an object involves measuring the cubic space occupied by the object, or dimensioning. Dimensional weight is widely used because shipping costs calculated based on weight of the goods alone would render it unprofitable for carriers when the shipped goods have low density, e.g., small weight but occupy a large space. By using dimensional weight in calculating shipping costs, on the other hand, carriers can charge based on either the actual weight or the dimensional weight of the shipped goods, usually depending on whichever is greater. Moreover, by dimensioning objects, such as parcels, packages, and pallets, carriers, warehouses, shipping retailers, postal companies, or the like may optimally utilize their storage space and charge for the service accordingly.

Dimensional weight involves the volumetric weight of an object, and, more specifically, the cubic space the object occupies. Typically, the dimensional weight of an object is calculated as the multiplicative product of the object's length, width, and height divided by a constant. For example, in the United States, the dimensional weight of an object is calculated by domestic air carriers as (length× width×height)/166, with all dimensions in inches. A parcel weighing 25 pounds and having volumetric dimensions of 20×15×15 inches would have, using the above formula, a dimensional weight of 27.1 pounds. In this example, the shipping charge would be determined based on the dimensional weight of 27.1 pounds, because it is greater than the actual weight of 25 pounds.

To expedite the dimensioning process and to facilitate accurate dimensioning, companies have invested in various automatic dimensioning systems. One type of dimensioning system, such as a volume dimensioning application, performs volumetric dimensioning of objects by first capturing an image of the objects and then finding those objects in the image. For instance, an image capturing device may be utilized to capture an image of a number of parcels waiting to be dimensioned. Afterwards, a computing device may select one of the parcels from the parcels in the image to calculate the dimensional weight for. To do so, the computing device may need to estimate the boundary of the selected parcel to determine its approximate length, width, and height for the calculation. However, it can be very difficult at times to discern a particular object or objects in an image due to insufficient lighting or the presence of numerous objects in the same image. Although such a volume dimensioning application may be designed as a standalone, automatic application, issues such as those mentioned above may cause inaccuracy in the dimensioning process and ultimately result in delay and extra operational costs.

BRIEF SUMMARY

A method of operating a dimensioning system to determine dimensional information for objects may be summarized as including acquiring a number of images; computationally identifying objects in at least one of the acquired images; computationally initially selecting one object represented in the at least one of the acquired images as a candidate for processing; providing an indication to a user indicative of the initially selected object; receiving at least one user input indicative of an object selected for processing; and computationally determining dimensional data for the object indicated by the received user input.

Receiving at least one user input indicative of an object selected for processing may include receiving a user selection that confirms the initially selected one object as the object for processing. Computationally determining dimensional data for the object indicated by the received user input may include determining a dimensional weight based on an estimated perimeter of the initially selected one object as represented in the acquired image. Receiving at least one user input indicative of an object selected for processing may include receiving a user selection that indicates an object other than the initially selected one object as the object for processing. Computationally determining dimensional data for the object indicated by the received user input may include determining a dimensional weight based on an estimated perimeter of the object indicated by the received user selection as the object is represented in the acquired image. The method may further include providing an indication to the user indicative of a currently selected object, the indication visually distinguishing the currently selected object in a display of the acquired image from any other object represented in the display of the acquired image. Receiving at least one user input indicative of an object selected for processing may include receiving a user selection that indicates at least a portion of a new perimeter for the object for processing. Computationally determining dimensional data for the object indicated by the received user input may include computationally determining dimensional data based on the new perimeter of the object represented in the acquired image. Providing an indication to a user indicative of the initially selected object may include displaying the acquired image and visually distinguishing the initially selected object in the display of the acquired image from any other objects represented in the display of the acquired image. Visually distinguishing the initially selected object in the display of the acquired image from any other objects represented in the display of the acquired image may include displaying a border about at least a portion of the initially selected object in the display of the acquired image. Receiving at least one user input indicative of an object selected for processing may include receiving at least one signal representing a position in the image that indicates a position of at least a portion of a new perimeter for the object for processing. Visually distinguishing the initially selected object in the display of the acquired image from any other objects represented in the display of the acquired image may include displaying a draggable border about at least a portion of the initially selected object in the display of the acquired image. Receiving at least one user input indicative of an object selected for processing may include receiving at least one signal representing a dragging of the draggable border to a new position that indicates at least a portion of a new perimeter for the object for processing. Computationally determining dimensional data for the object indicated by the received user input may include computationally determining a dimension of at least one of a box, a package, a parcel, a pallet or a document represented in the acquired image.

A method of operating a dimensioning system to determine dimensional information for objects may be summarized as including acquiring a number of images; computationally identifying objects or spaces in at least one of the acquired images; determining dimensional data for at least one object or space; and receiving at least one user input indicative of an object or space selected for processing.

The method may further include computationally determining dimensional data for the object or space selected by the received user input. The method may further include computationally revising the determined dimensional data for the at least one object or space in response to the received user input. Receiving at least one user input may include receiving at least one user input in the form of at least one of a keyboard entry, a computer mouse entry, a touch-screen device entry, a voice command, an audible command, and a bar code reading. Receiving at least one user input indicative of an object or space selected for processing may include receiving a user selection that confirms the initially selected one object or space as the object for processing. Computationally determining dimensional data for the object or space selected by the received user input may include determining a dimensional weight based on an estimated perimeter of the initially selected one object as represented in the acquired image. Computationally determining dimensional data for the object or space selected by the received user input may include determining a dimensional data based on an estimated perimeter of the initially selected one space as represented in the acquired image. Receiving at least one user input indicative of an object or space selected for processing may include receiving a user selection that indicates an object or space other than the initially selected one object or space as the object or space for processing. Computationally determining dimensional data for the object or space selected by the received user input may include determining a dimensional weight based on an estimated perimeter of the object selected by the received user selection as the object is represented in the acquired image. Computationally determining dimensional data for the object or space selected by the received user input may include determining a dimensional data based on an estimated perimeter of the space selected by the received user selection as the space is represented in the acquired image. The method may further include providing an indication to the user indicative of a currently selected object or space, the indication visually distinguishing the currently selected object or space in a display of the acquired image from any other object or space represented in the display of the acquired image. Receiving at least one user input indicative of an object or space selected for processing may include receiving a user selection that indicates at least a portion of a new perimeter for the object or space for processing. Computationally determining dimensional data for the object or space selected by the received user input may include computationally determining dimensional data based on the new perimeter of the object or space represented in the acquired image in response to the received user input.

A dimensioning system to determine dimensional information for objects may be summarized as including an imager configured to acquire images; a user input/output system configured to display images and to receive user input; and a processor configured to identify objects in the acquired images, initially select one of the identified objects for processing, cause the acquired images to be displayed via the user input/output system along with an indication indicative of the initially selected one object, and computationally determine dimensional data for an object indicated by at least one user input received via the user input/output system.

The processor may be configured to determine a dimensional weight based on an estimated perimeter of the initially selected one object as represented in the acquired image in response to at least one user input confirming the initially selected one object as the object to be processed. The processor may be configured to computationally determine a dimensional weight based on a new perimeter of the initially selected one object represented in the acquired image in response to at least one user input indicative of the new perimeter. The processor may be configured to determine a dimensional weight based on an estimated perimeter of an object represented in the acquired image other than the initially selected one object in response to at least one user input selecting the other object as the object to be processed. The processor may be configured to determine a dimensional weight based on a user identified perimeter of an object represented in the acquired image other than the initially selected one object in response to at least one user input selecting the other object as the object to be processed and identifying at least a portion of the user identified perimeter. The processor may be configured to cause acquired images to be displayed via the user input/output system along with an indication indicative of the initially selected one object by displaying a draggable border about at least a portion of the initially selected object in the display of the acquired image. The processor may be further configured to cause acquired images to be displayed via the user input/output system along with an indication indicative of a user selected object by displaying a draggable border about at least a portion of a user selected object in the display of the acquired image. The user input/output system may include a touch-sensitive display. The processor may be further configured to cause the user input/output system to display dimensional data for one or more objects in the acquired images.

A dimensioning system to determine dimensional information for confined empty spaces may be summarized as including an imager to acquire images; a user input/output system to display images and to receive user input; and a processor configured to identify spaces in the acquired images, initially select one of the identified spaces for processing, cause the acquired images to be displayed via the user input/output system along with an indication indicative of selection of the initially selected space, and computationally determine dimensional data for a space indicated by at least one user input received via the user input/output system.

The processor may be configured to computationally determine the dimension data based on an estimated perimeter of the initially selected space as represented in the acquired image in response to at least one user input confirming the initially selected space as the space to be processed. The processor may be configured to computationally determine the dimensional data based on a new perimeter of the initially selected space represented in the acquired image in response to at least one user input indicative of the new perimeter. The processor may be configured to computationally determine the dimensional data based on an estimated perimeter of a space represented in the acquired image other than the initially selected space in response to at least one user input selecting the other space as the space to be processed. The processor may be configured to computationally determine the dimensional data based on a user identified perimeter of a space represented in the acquired image other than the initially selected space in response to at least one user input selecting the other space as the space to be processed and identifying at least a portion of the user identified perimeter. The processor may be configured to cause acquired images to be displayed via the user input/output system along with an indication indicative of the initially selected space by displaying a draggable border about at least a portion of the initially selected space in the display of the acquired image. The processor may be further configured to cause acquired images to be displayed via the user input/output system along with an indication indicative of a user selected space by displaying a draggable border about at least a portion of a user selected space in the display of the acquired image. The user input/output system may include a touch-sensitive display. The processor may be further configured to cause the user input/output system to display dimensional data related to one or more objects.

A computer-readable medium storing therein instructions to cause a computer to execute a process related to determining dimensional information for objects may be summarized as including displaying an image; identifying objects represented in the displayed image; initially selecting one object of the objects represented in the displayed image for processing; causing the displayed image and an indication indicative of the initially selected one object to be displayed; receiving user input; and determining dimensional data for an object indicated by at least one user input.

Determining dimensional data for an object indicated by at least one user input may include determining a dimensional weight based on an estimated perimeter of the initially selected one object as represented in the displayed image in response to at least one user input confirming the initially selected one object as the object to be processed. Determining dimensional data for an object indicated by at least one user input may include determining a dimensional weight based on a new perimeter of the initially selected one object represented in the displayed image in response to at least one user input indicative of the new perimeter. Determining dimensional data for an object indicated by at least one user input may include determining a dimensional weight based on an estimated perimeter of an object represented in the displayed image other than the initially selected one object in response to at least one user input selecting the other object as the object to be processed. Determining dimensional data for an object indicated by the at least one user input may include determining a dimensional weight based on a user identified perimeter of an object represented in the displayed image other than the initially selected one object in response to at least one user input selecting the other object as the object to be processed and identifying at least a portion of the user identified perimeter. Causing the displayed image and an indication indicative of the initially selected one object to be displayed may include causing the displayed image to be displayed and causing a draggable border about at least a portion of the initially selected one object to be displayed in the displayed image. Causing the displayed image and an indication indicative of the initially selected one object to be displayed may include causing the displayed image to be displayed and causing a draggable border about at least a portion of a user selected object to be displayed in the displayed image.

A computer-readable medium storing therein instructions to cause a computing system to execute a process related to determining dimensional information for objects may be summarized as including displaying an image; identifying objects or spaces represented in the displayed image; providing an indication to a user; receiving user input; and determining dimensional data for an object or space in response to the user input.

Providing an indication to a user may include indicating a problem related to an object or space of the objects or spaces in the displayed image to the user. Indicating a problem related to an object or space of the objects or spaces in the displayed image to the user may include indicating a problem in determining dimensional data for an object or space of the objects or spaces in the displayed image to the user. Receiving user input may include receiving the user input in the form of at least one of a keyboard entry, a computer mouse entry, a touch-screen device entry, a voice command, an audible command, and a bar code reading. The process may further include displaying a second image after receiving the user input; identifying objects or spaces represented in the second image; and receiving a second user input. Determining dimensional data for an object or space in response to the user input may include determining dimensional data for an object or space identified in the second image in response to the second user input. The process may further include determining dimensional data for one of the identified objects or spaces in the displayed image prior to receiving the user input. The process may further include displaying a dimensional data for an object or space.

A processor-implemented method of selecting an object from at least one object in an image to process information about the selected object may be summarized as including providing an image of the at least one object; selecting a first object of the at least one object in the image; updating the image to indicate the selection of the first object; receiving an input related to the selection of the first object; updating the image to indicate the input; and computationally determining dimensional data related to one of the at least one object using the input.

Updating the image to indicate the selection of the first object may include updating the image to indicate an estimated perimeter around the first object. Receiving an input related to the selection of the first object may include receiving the input selecting a second object of the at least one object that is different than the first object. Receiving an input related to the selection of the first object may include receiving the input to modify an aspect related to the indication of the selection of the first object. Receiving the input to modify an aspect related to the indication of the selection of the first object may include receiving the input to modify an estimated perimeter of the first object. Receiving an input related to the selection of the first object may include receiving the input as a user selection on a portion of a touch-screen device to select a second object of the at least one object. Receiving an input related to the selection of the first object may include receiving the input as a boundary drawn on a touch-screen device around an image of a second object of the at least one object to select the second object. Receiving an input related to the selection of the first object may include detecting a number of contacts at a number of positions on a touch-screen device, the contacts indicative of a number of corners of the first object. Receiving an input related to the selection of the first object may include receiving at least one user input indicative of a new position of a corner of the first object in the image displayed on a touch-screen device. Receiving an input related to the selection of the first object may include receiving at least one user input indicative of a perimeter of one of the at least one object on a touch-screen device indicative of a selection of the one of the at least one object. Determining dimensional data related to one of the at least one object using the input may include determining a dimensional weight of the one of the at least one object based on a computationally determined estimated perimeter of the one of the at least one object. Determining dimensional data related to one of the at least one object using the input may include determining a dimensional weight of the one of the at least one object based on a user identified perimeter of the one of the at least one object.

A processor-implemented method of selecting an object from at least one object in an image to process information about the selected object may be summarized as including displaying the image of the at least one object; selecting a first object of the at least one object in the image; updating the image to indicate the selection of the first object; receiving an input related to the selection of the first object; and updating the image to indicate the input.

Updating the image to indicate the selection of the first object may include updating the image to indicate an estimated perimeter around the first object. Receiving an input related to the selection of the first object may include receiving the input selecting a second object of the at least one object that is different than the first object. Receiving an input related to the selection of the first object may include receiving the input to modify an aspect related to the indication of the selection of the first object. Receiving the input to modify an aspect related to the indication of the selection of the first object may include receiving the input to modify an estimated perimeter of the first object. Receiving an input related to the selection of the first object may include receiving the input as a user selection on a portion of a touch-screen device to select a second object of the at least one object. Receiving an input related to the selection of the first object may include receiving the input as a boundary drawn on a touch-screen device around an image of a second object of the at least one object to select the second object. Receiving an input related to the selection of the first object may include detecting a number of contacts at a number of positions on a touch-screen device, the contacts indicative of a number of corners of the first object. Receiving an input related to the selection of the first object may include receiving at least one user input indicative of a new position of a corner of the first object in the image displayed on a touch-screen device. Receiving an input related to the selection of the first object may include receiving at least one user input indicative of a perimeter of one of the at least one object on a touch-screen device indicative of a selection of the one of the at least one object. Receiving an input may include receiving an audible command from a user. Receiving an input may include receiving a verbal command from a user. The method of claim may further include computationally determining dimensional data related to one of the at least one object using the input. Determining dimensional data related to one of the at least one object using the input may include determining a dimensional weight of the one of the at least one object based on a computationally determined estimated perimeter of the one of the at least one object. Determining dimensional data related to one of the at least one object using the input may include determining a dimensional weight of the one of the at least one object based on a user identified perimeter of the one of the at least one object.

Figure 1A:
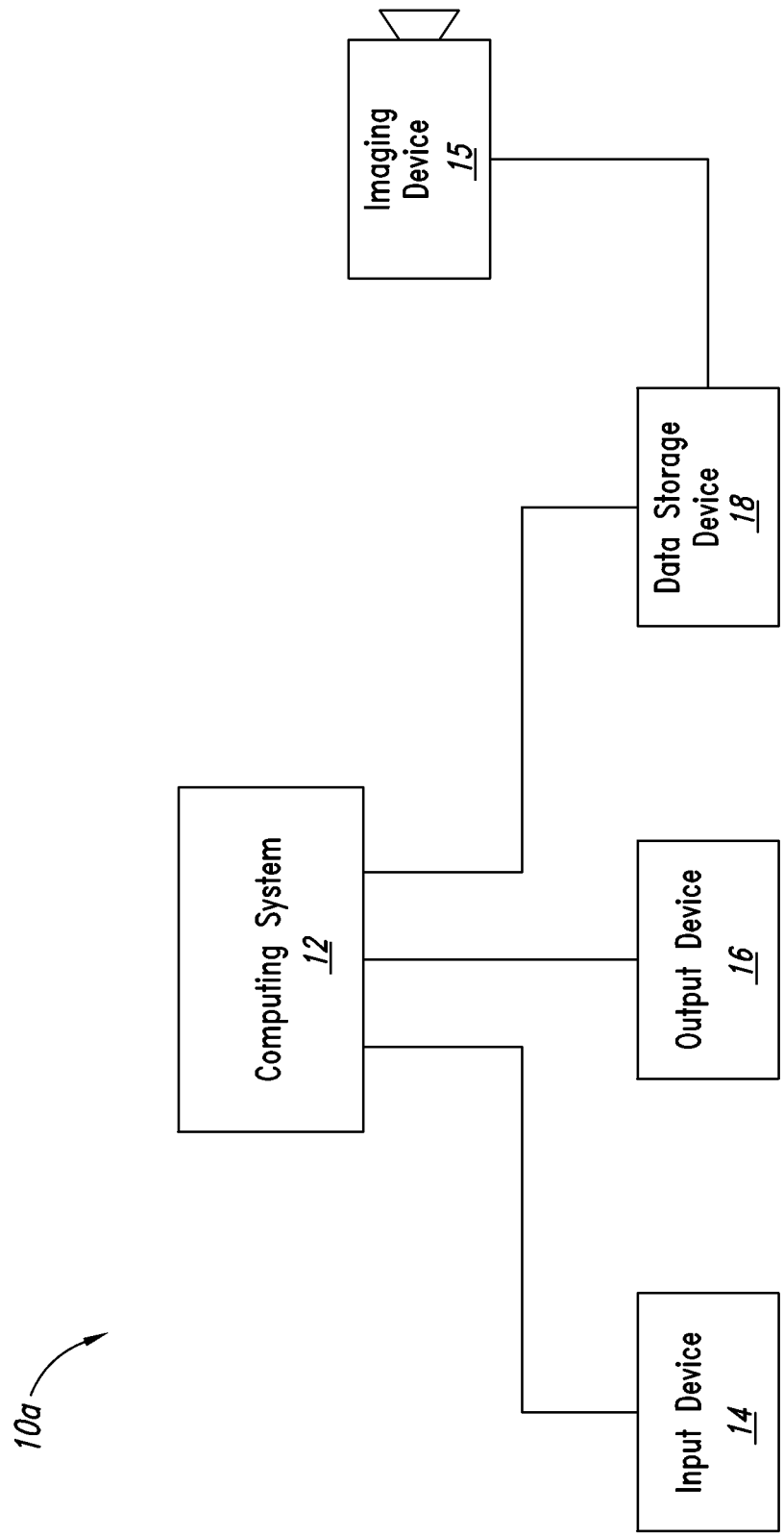
FIG. 1A is a block diagram showing a dimensioning system configured to determine dimensional information related to objects according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, imagers (e.g., cameras), and/or transport mechanisms (e.g., conveyors) have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

Figure 1B:
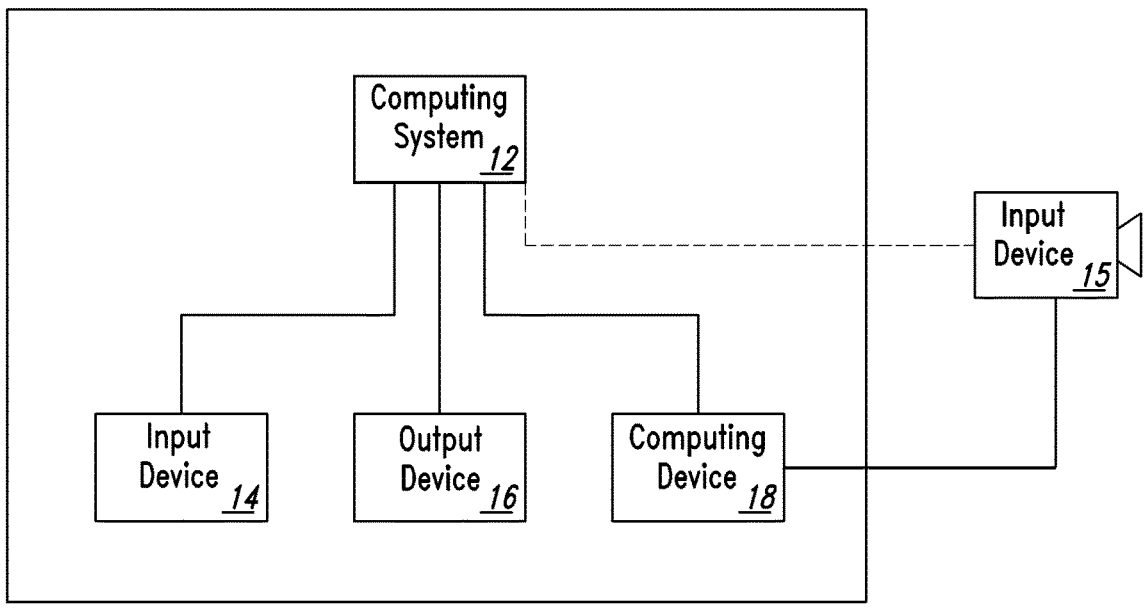
FIG. 1B is a block diagram showing another dimensioning system configured to determine dimensional information related to objects according to one non-limiting illustrated embodiment.

FIG. 1A shows a dimensioning system 10a configured to determine dimensional information related to objects according to one non-limiting illustrated embodiment. In one embodiment, the dimensioning system 10a includes a computing system 12 communicatively coupled with a user input device 14, a user output device 16, and a data storage device. In various embodiments, an imager 15 may be communicatively coupled to the data storage device 18, the computing system 12, or both. In one embodiment, the dimensioning system 10a may comprise a collection of individual standalone devices. In another embodiment, the dimensioning system 10a may comprise an integrated device plus at least one standalone device coupled to the integrated device, such as a handheld computer system by INTERMEC TECHNOLOGIES™ coupled to a standalone imager. For example, as shown in FIG. 1B, a computing system 12, a user input device 14, a user output device 16, and a data storage device 18 may be integral components of a dimensioning system 10b, with an external imager 15 coupled to either or both of the computing system 12 and the data storage device 18. In an alternative embodiment, a dimensioning system 10 may comprise one integrated device, such as a personal digital assistant (PDA) or one of the imaging-capable handheld computer systems by INTERMEC TECHNOLOGIES™. For example, as shown in FIG. 1C, a dimensioning system 10c may be an integrated device having a computing system 12, a user input device 14, a user output device 16, a data storage device 18, and an imager 15 as its integral components.

In some embodiments, the computing system 12 may be, for example, a desktop computer, a notebook computer, a handheld computer, a PDA, a workstation, a mainframe computer, or a processor in any type of the aforementioned computers or devices. The user input device 14 may be, for example, a keyboard, a computer mouse, a touch-screen device, a voice recognition device, a bar code reader, or any combination thereof. The user output device 16 may be, for example, a standalone monitor (e.g., a liquid-crystal display monitor or a cathode-ray tube monitor), a display screen, an auditory device, or a touch-screen device. In one embodiment, the user input device 14 and the user output device 16 may each be a part of a touch-screen device, which, as known in the art, is a display device that can detect the presence and location of a touch within a display area of the display device. For example, a touch-screen device including both the user input device 14 and the user output device 16 may have a screen that is operable to display an image and detect a contact to the screen by a user's finger, hand, or a writing tool such as a stylus. The data storage device 18 is preferably operable to store digital data that includes textual and numerical data, digitized images, and data input by a user of the dimensioning system 10, etc. The data storage device 18 may comprise a memory device such as, for example, a hard drive (whether as an integral part of the dimensioning system 10 or as a standalone device), a recording medium, or an integrated-circuit memory device (e.g., memory chip). The imager 15 may be, for example, a charge-coupled device (CCD), a complementary metal-oxide-semiconductor (CMOS) active-pixel sensor, or any similar image sensing or capture device that converts an optical image to a signal representative of the image.

Figure 1C:
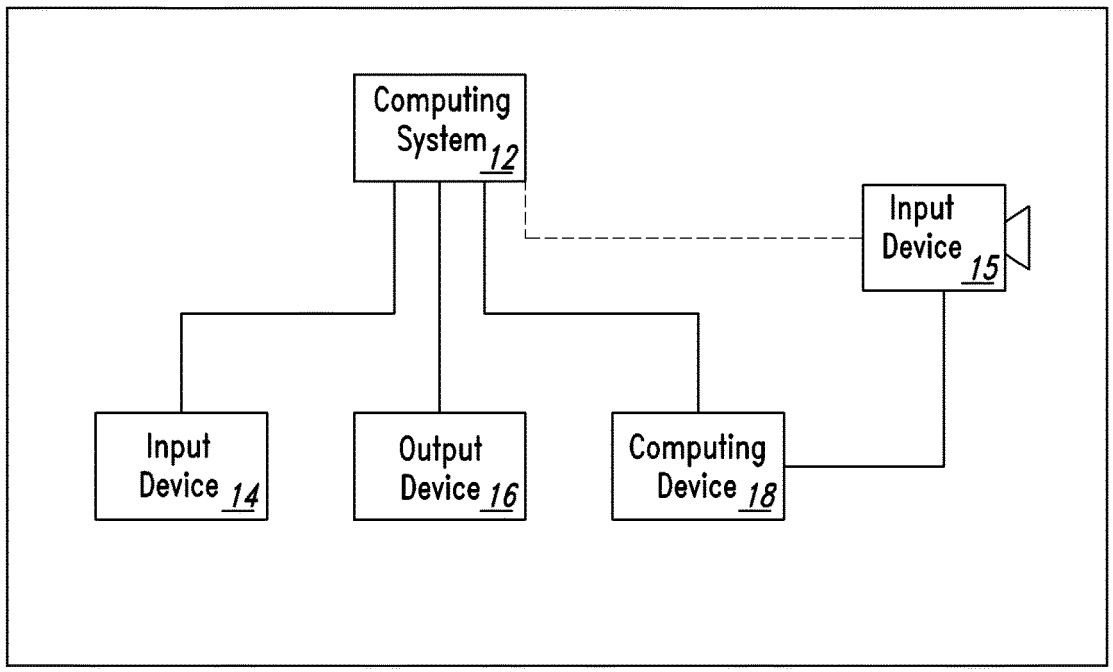
FIG. 1C is a block diagram showing yet another dimensioning system configured to determine dimensional information related to objects according to one non-limiting illustrated embodiment.

In operation, the dimensioning system 10 of FIGS. 1A-1C is preferably operable to acquire or capture an image of one or more objects and/or spaces using the imager 15 as image data. The one or more objects may be, for instance, parcels, packages, pallets, documents, boxes, or the like that need to have their respective dimensional weight or dimensions determined. The image data representing the captured image of the one or more objects and/or spaces may be stored in the data storage device 18. The captured image may also be displayed by the user output device 16 as directed by the computing system 12. The computing system 12 may, without any external input, automatically select one of the objects or spaces represented in the image as the object or space on which further data processing will be performed, e.g., to determine the dimensional weight of the selected object or a dimension related to the selected space. An indication of the selection of the object or space may be reflected in the displayed image. For example, the representation of the selected object or space may be highlighted, circled, flashed, marqueed, represented in a different color, or somehow marked to visually indicate to a viewer (e.g., user) of such selection by the computing system 12. As a result, the image of the one or more objects and/or spaces and the indication of the selection of one of the objects or spaces by the computing system 12 are displayed on the user output device 16 for user interaction before further computation by the computing system 12 is carried out. In an alternative embodiment, the computing system 12 makes no selection and simply causes the user output device 16 to display the image of the objects and/or spaces and awaits the user to make a user input selecting or identifying one of the objects or spaces before the computing system 12 performs computation based on the user input. In another alternative embodiment, the computing system 12 displays information about the object such as dimensions, color, data from a bar code symbol, or information indicating previously chosen objects.

A user of the dimensioning system 10 viewing the displayed image of the one or more objects may provide user input through the user input device 14. If the user agrees that it is the selected object on which further computation is to be performed, the user input may simply be one form of validation, such as, for example, a click of a computer mouse, a touch on a "Yes" button or user selectable icon on the user input device 14 in the form of a touch-screen device, pressing and releasing of a key on a keyboard, a check mark entered in an input field displayed on the user input device 14 in the form of a touch-screen device, or an audible or verbal command such as "Object 3," for example. If the user agrees with the selection but wishes to make some modification to the selection (e.g., to correct the estimated perimeter of the selected object before dimensional weight is calculated based on the estimated perimeter), the user input may include both a validation and a modification, or simply a modification. For example, the perimeter estimated by the computing system 12 may be entirely or partially incorrect due to insufficient lighting in the image or too many or overlapping objects in the image making it difficult to discern the perimeter of the selected object. In such case, the user may modify all or a portion of the perimeter of the selected object as estimated by the computing system 12 and show in the image on the output device 16. If, however, the user disagrees with the selection by the computing system 12 and wishes to select a different object among the objects represented in the displayed image, the user input may include a selection of a different object in the image. For instance, when an object A of two objects represented in the displayed image is selected by the computing system 12 and the user wishes to select an object B instead, the user may enter his/her selection of object B by one of various ways. In another situation, there may be an inadequate image for certain packages, such as when a package is viewed straight on, only two of the tree dimensions are visible. Accordingly, in one embodiment, the computing system 12 may request that the user perform a task, such as issuing the command "Please move right or left and re-image Object 3," for example.

The method by which the user enters his/her input may include, but is not limited to, one of the following: selecting or indicating at least a portion of the representation of object B in the displayed image; drawing or otherwise indicating a boundary around the representation of object B in the displayed image displayed on a touch-screen device; drawing a mark on or otherwise marking object B in the displayed image; and/or pointing out or otherwise indicating or selecting the corners or other specific features of object B in the displayed image. The user may take such action by, for example, manipulating a cursor or pointer icon displayed in the image using a pointer device (e.g., computer mouse, trackball, joystick, and rocker switch or arrow keys), or by using audible or verbal commands. The user may take such action by touching one or more portions of a touch sensitive screen on which the image is displayed, for example, to select portions of the objects B or user selectable icons.

Whether the user input validates or modifies the selection of the computing system 12, or selects a new object in the image, the user output device 16 may display the user input along with the representation of the at least one object in the image. For example, the user may validate the selection of a first object of the objects represented in the image yet at the same time modify the estimated perimeter of the representation of the first object by tracing or otherwise indicating the actual perimeter (i.e., indicated perimeter) of the representation of the first object on the display of the user output device 16. For instance, the user may select a portion of the perimeter of object and drag the selected portion using a pointer device (e.g., mouse, trackball, joystick, etc), a finger or a stylus (e.g., touch screen). In such case, the user output device 16 may show the traced line on the display as drawn by the user. If the user selects a second object of the objects represented in the image (e.g., by drawing a cross or a check mark on the second object), the user output device 16 may then represent the cross or check mark on the display. This provides an interaction between the dimensioning system 10 and the user in that the user provides user input as a part of the overall process of determining a dimensional value of the selected object (e.g., volume dimensioning), and the dimensioning system 10 provides an indication or feedback to the user of the user's input and performs computation based on the user input.

After the user provides input to the dimensioning system 10 through the user input device 14, the computing system 12 performs computation related to the selected object based on the user input. In the case of volume dimensioning where the dimensional weight of an object is computed, the computing system 12 computes the dimensional weight of the selected object based on an estimated or indicated perimeter of the selected object. More specifically, in one embodiment, the computing system 12 is able to estimate a length, width, and height of the selected object, for example, by using the estimated or indicated perimeter of the selected object. Once the dimensional weight of the selected object has been determined, the charge for shipment of the selected object may then be determined.

Thus, by allowing the user to validate the object selection by the computing system 12, or by allowing the user to select an object for the computing system 20 to perform volume dimensioning on, or both, issues related to inaccuracy caused by selection of a wrong object or an erroneous estimation of the object's perimeter (and thus dimensions)

by the computing system 12 due to insufficient lighting or presence of numerous objects in the image or other issues may be avoided. The user interaction serves as a check in the dimensioning process, ensuring that the correct object is selected and that computation is based on dimensions derived from a correct perimeter of the selected object.

Figure 2A:
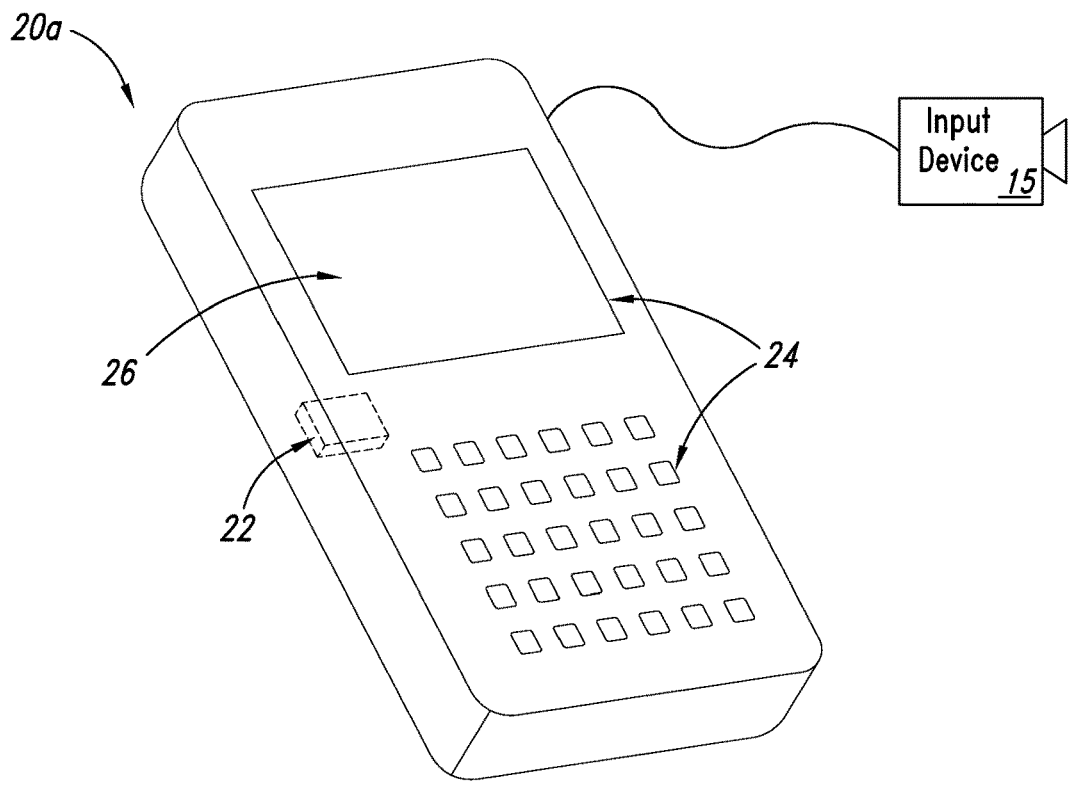
FIG. 2A is a block diagram showing an electronic device according to one non-limiting illustrated embodiment.

FIG. 2A shows an electronic device 20a according to one non-limiting illustrated embodiment. The electronic device 20a may be coupled to an imager 25 operable to acquire or otherwise capture images and provide image data representing the acquired or captured images to the electronic device 20a. In one embodiment, the electronic device 20a may include a processing component 22, a user input component 24, and a display component 26. The display component 26 may display an image provided by the imager 25, and such image may include one or more objects for which a dimensional value (e.g., a dimensional weight) is to be determined. The user input component 24 may receive input from a user of the electronic device 20a. In one embodiment, the display component 26 may be a liquid-crystal display, and the user input component 24 may be a keyboard having a plurality of keys for the user to enter input. In an alternative embodiment, the electronic device 20a may include a touch-screen display that serves as both the user input component 24 (e.g., touch-sensitive overlay) and the display component 26 (e.g., LCD, O-LCD). In another embodiment, the electronic device 20a may include a touch-screen display that serves as both the user input component 24 and the display component 26, while the electronic device 20a further includes a keyboard having a plurality of keys as another portion of the user input component 24. For example, the user may enter input via either the touch-screen display, the keyboard, or both. The processing component 22 is coupled to the user input component 24 and the display component 26.

In one embodiment, the processing component 22 is operable to determine from an image captured by the imager 25 an approximate perimeter of a first object of at least one object in the image. The processing component 22 may cause the display component 26 to display the captured image and an indicator that indicates the approximate perimeter of the first object. Upon receiving at least one input from the user via the user input component 24, the processing component 22 determines a dimensional value of one of the objects in the displayed image based on the user input. For example, the processing component 22 may perform computation for volume dimensioning on the first object if the user input validates or modifies the approximate perimeter of the first object. If the user input modifies the approximate perimeter of the first object, the computation will be based on the modified perimeter. Otherwise, in the case of the user input indicates validation, the computation will be based on the approximate perimeter determined by the processing component 22. Alternatively, if the user selects a second object different than the first object from objects represented in the displayed image, the processing component 22 may perform volume dimensioning on the second object to determine the dimensional weight of the second object.

Figure 2B:
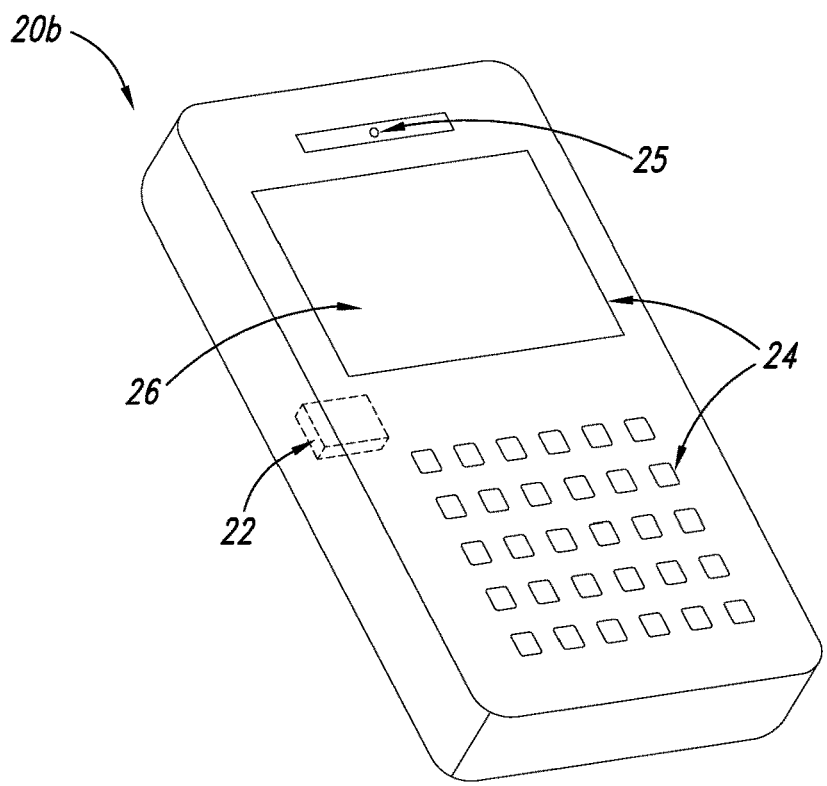
FIG. 2B is a block diagram showing another electronic device according to one non-limiting illustrated embodiment.

FIG. 2B shows a diagram of an electronic device 20b according to another non-limiting illustrated embodiment. The electronic device 20b may include a processing component 22, a user input component 24, a display component 26, and an imager 25. In one embodiment, the electronic device 20b may perform functions similar to those performed by the electronic device 20a of FIG. 2A. Therefore, in the interest of brevity, a description of the components of the electronic device 20b will not be repeated.

Figure 3A:
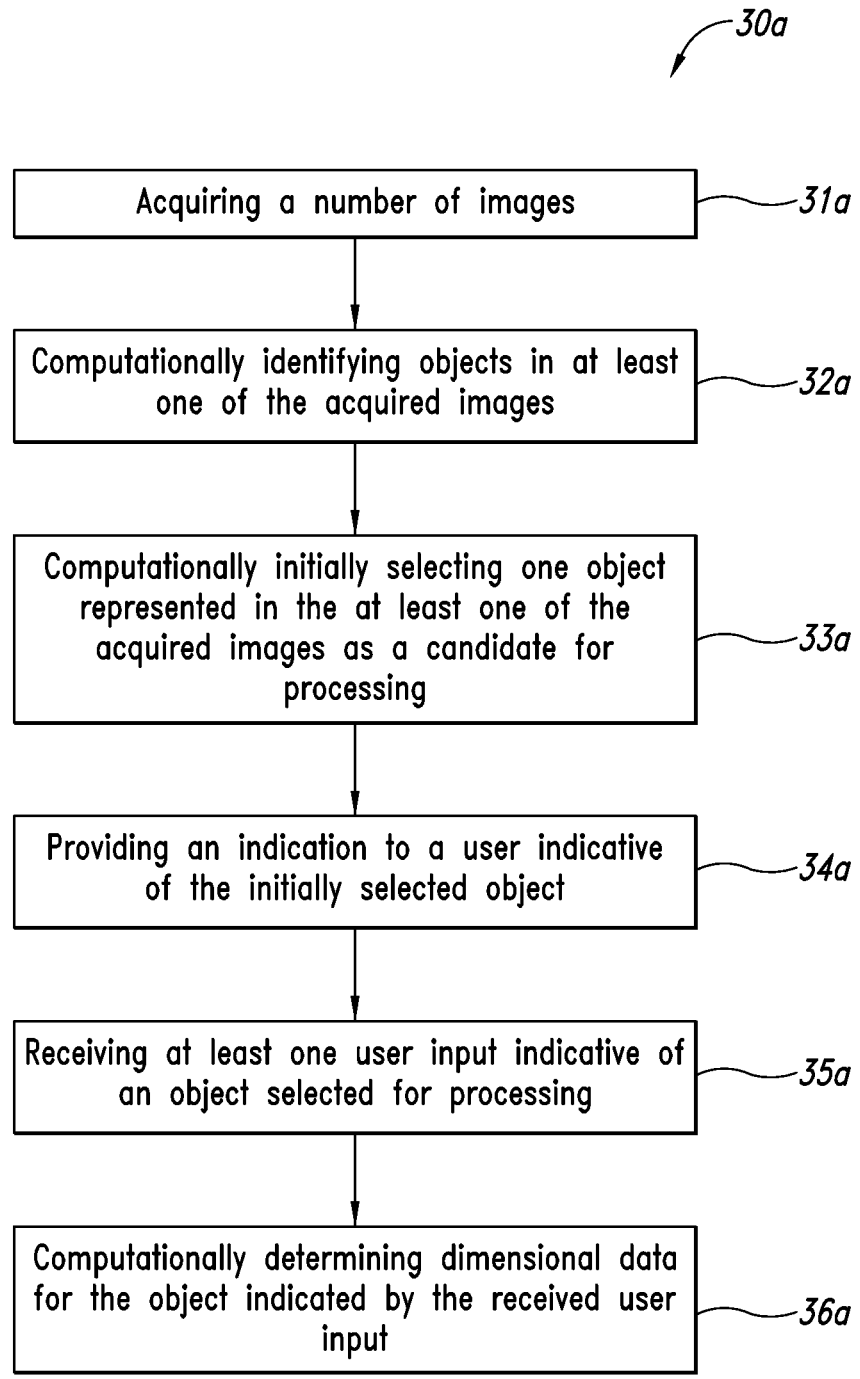
FIG. 3A is a flow chart showing a process of operating a dimensioning system to determine dimensional information for objects according to one non-limiting illustrated embodiment.

FIG. 3A shows a flow chart of a process 30a of operating a dimensioning system to determine dimensional information for objects according to one non-limiting illustrated embodiment. In one embodiment, at 31a, a number of images is captured or acquired. At 32a, objects in at least one of the acquired images are computationally identified, for example, by a processor-based system or a computing system. At 33a, one object represented in the at least one of the acquired images is computationally initially selected as a candidate for processing. In one embodiment, the selection is made automatically by a computing system or a processor-based system without any human interaction. An indication to a user to indicate the initially selected object is provided at 34a. At least one user input indicative of an object selected for processing is received at 35a. Then, at 36a, dimensional data for the object indicated by the received user input is computationally determined. For example, in one embodiment, a dimension of at least one of a box, a package, a parcel, a pallet or a document represented in the acquired image is computationally determined.

In one embodiment, the at least one user input received may include a user selection that confirms the initially selected one object as the object for processing. In another embodiment, the at least one user input received may include a user selection that indicates an object other than the initially selected one object as the object for processing. For example, when the user desires to determine dimensional data for an object that is different than the object initially selected by an automatic process executed in a computing system, the user manually selects the user-selected object before the computing system proceeds further. When the user input confirms the initially selected one object as the object for processing, in one embodiment, a dimensional weight of the initially selected one object is determined based on an estimated perimeter of the initially selected one object as represented in the acquired image. Alternatively, when the user input selects a different object, a dimensional weight of the user-selected object is determined based on an estimated perimeter of the user-selected object as represented in the acquired image. Further, when the user input selects a different object, process 30a may additionally include (not shown) providing an indication to the user indicative of a currently selected object to visually distinguish the currently selected object in a display of the acquired image from any other object represented in the display of the acquired image.

In one embodiment, the at least one user input received indicates at least a portion of a new perimeter for the object for processing. In such case, in one embodiment, the dimensional data is computationally determined based on the new perimeter, as indicated by the user input, of the object represented in the acquired image. For instance, when an estimated perimeter of the selected object, as represented in the acquired image on a display, is partially or entirely incorrect (e.g., due to insufficient lighting or the presence of numerous objects when the image is acquired), the user may modify the estimated perimeter so that dimensional data for the selected object is computed not based on incorrect information (e.g., incorrect estimated perimeter) but based on modified information.

In one embodiment, the user is notified of the initial selection of the initially selected one object by a display of the acquired image, where the initially selected one object is visually distinguished in the display of the acquired image from any other objects represented in the display of the acquired image. In one embodiment, the initially selected one object is visually distinguished from any other objects represented in the display of the acquired image with a display of a border about at least a portion of the initially selected object in the display of the acquired image. In such a case, in an embodiment, the at least one user input received may include at least one signal representing a position in the image that indicates a position of at least a portion of a new perimeter for the object for processing. In an alternative embodiment, the initially selected one object is visually distinguished from any other objects represented in the display of the acquired image with a display of a draggable border about at least a portion of the initially selected object in the display of the acquired image. For example, the at least one user input received may include at least one signal representing a dragging of the draggable border to a new position that indicates at least a portion of a new perimeter for the object for processing.

It should be appreciated by one skilled in the art that the process 30a may be implemented in one integrated device or in multiple standalone devices. For example, the process 30a may be implemented in any of the computing system 10a, 10b, and 10c of FIGS. 1A-1C, and the process 30a may be implemented in the electronic device 20a of FIG. 2A or in the electronic device 20b or FIG. 2B.

Figure 3B:
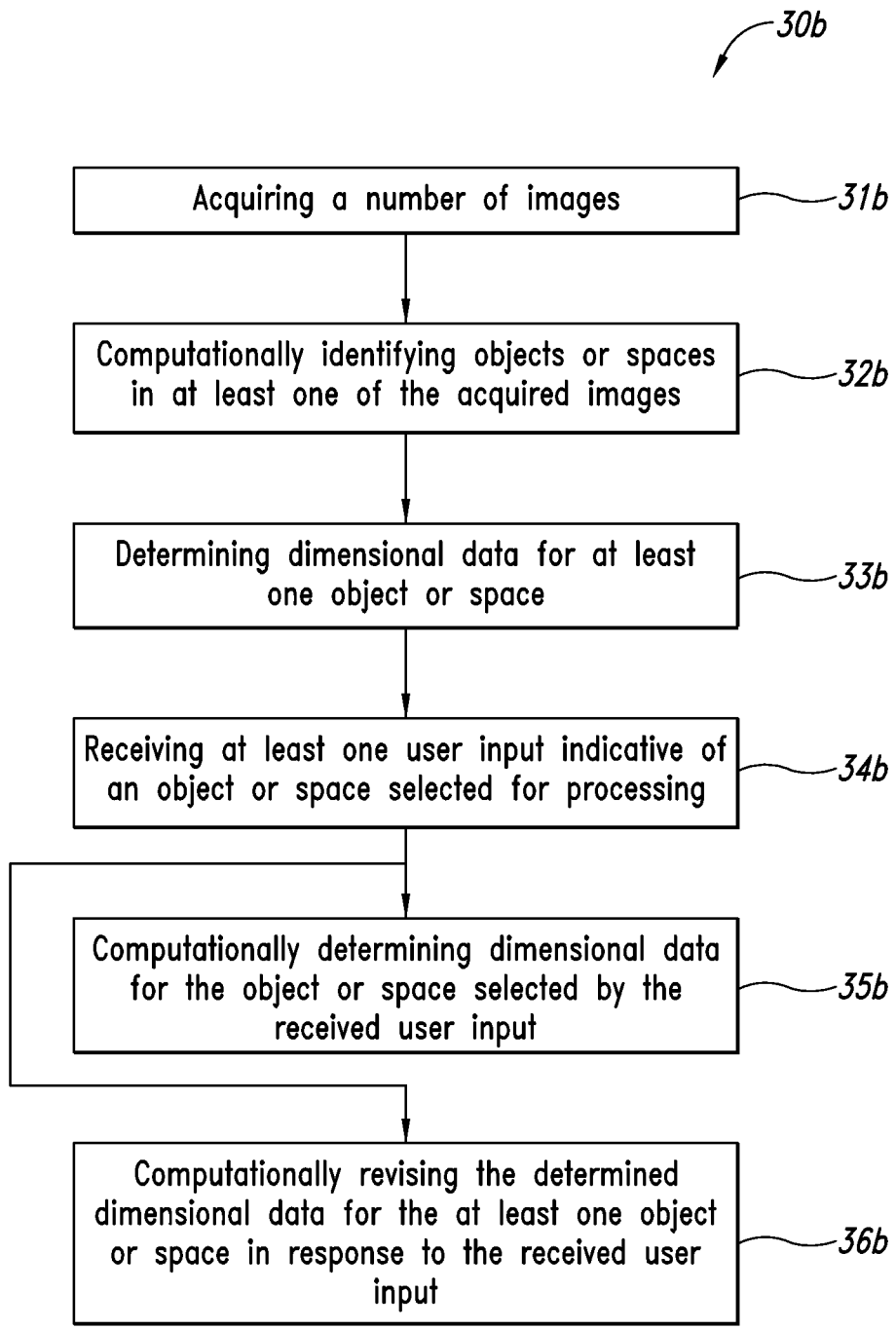
FIG. 3B is a flow chart showing a process of operating a dimensioning system to determine dimensional information for objects according to another non-limiting illustrated embodiment.

FIG. 3B shows a flow chart of a process 30b of operating a dimensioning system to determine dimensional information for objects according to one non-limiting illustrated embodiment. In one embodiment, at 31b, a number of images is captured or acquired. At 32b, objects or spaces in at least one of the acquired images are computationally identified, for example, by a processor-based system or a computing system. At 33b, the dimensional data for at least one object or space is determined. In one embodiment, a processor-based system or a computing system automatically selects an object or space in an acquired image and computes a dimensional data for the selected object or space without any human interaction. At least one user input indicative of an object or space selected for processing is received at 34b. In one embodiment, the user input may indicate an agreement with the selection of the object or space for which a dimensional data is determined. In another embodiment, the user input may select a different object or space for which a dimensional data is to be determined.

The process 30b may further computationally determine dimensional data for the object or space selected by the received user input at 35b. For example, in one embodiment, this may be due to the user input selecting an object or space that is different from the object or space for which a dimensional data has been determined. The process 30b may further computationally revise the determined dimensional data for the at least one object or space in response to the received user input at 36b. For example, in one embodiment, the user may agree with the selection of the object or space but disagree with the certain aspect of the selection (e.g., the border of the selected object or space which is used to determine the volume of the object or space). In such case, the user input may be a modification to that aspect of the selection of the object or space, such as, for example, a change in the selected object's or space's border.

The user input may come in different forms. For example, the user input may be a keyboard entry on a keyboard, a click or "click and drag" using a computer mouse, entry through a touch-sensitive screen by the user's finger or a stylus or similar tool, a voice command including at least one command word, an audible command such as a clap or some recognizable sound, or entry by a bar code reader.

As with the process 30a, the process 30b may be implemented in one integrated device or in multiple standalone devices. For example, the process 30b may be implemented in any of the computing system 10a, 10b, and 10c of FIGS. 1A-1C, and the process 30b may be implemented in the electronic device 20a of FIG. 2A or in the electronic device 20b or FIG. 2B.

Figure 4A:
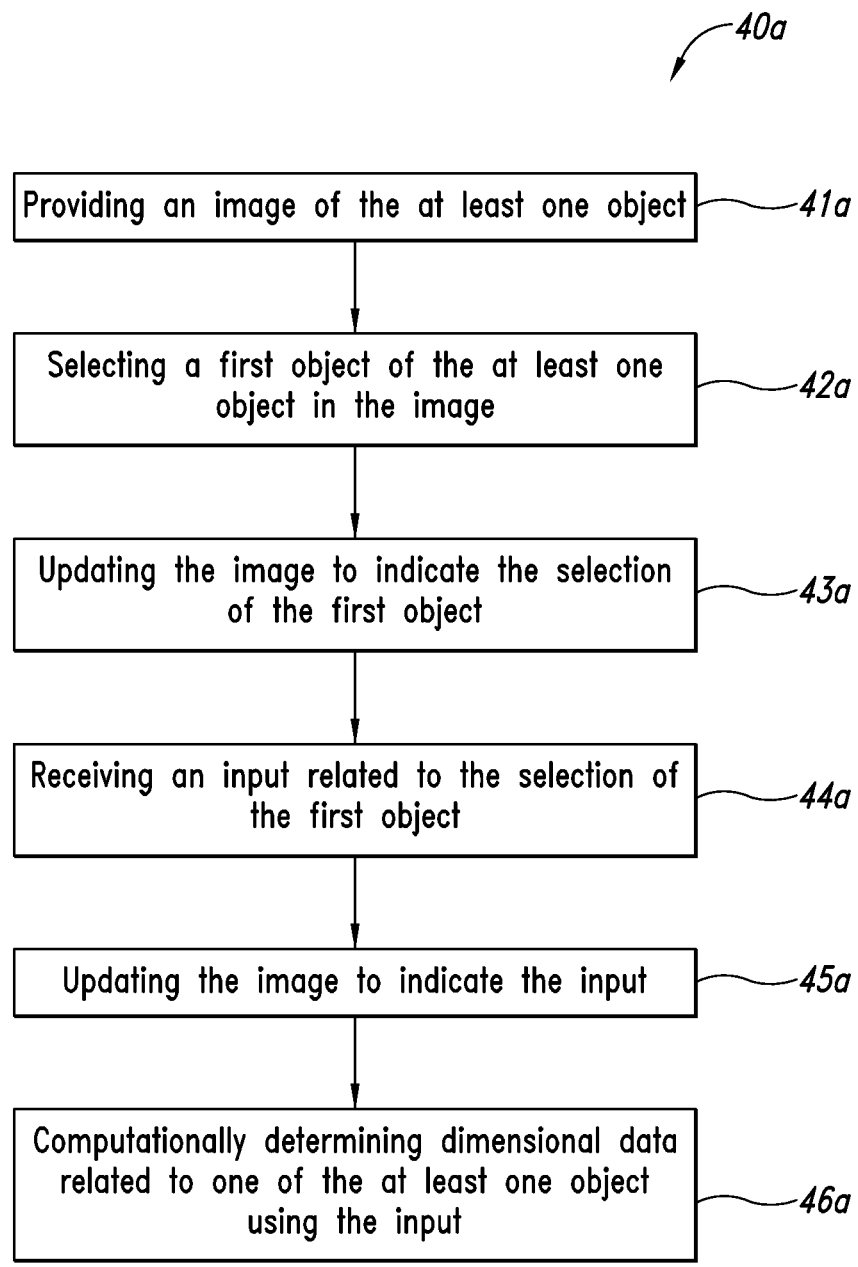
FIG. 4A is a flow chart showing a processor-implemented method of selecting an object from at least one object in an image to process information about the selected object according to one non-limiting illustrated embodiment.

FIG. 4A shows a flow chart of a process 40a of selecting an object from at least one object in an image to process information about the selected object according to one non-limiting illustrated embodiment. In one embodiment, at 41a, an image of the at least one object is provided. At 42a, a first object of the at least one object in the image is selected. For example, a computing system executing the process 40a may be configured to automatically select the first object of the at least one object in the image without any human interaction. The image is updated to indicate the selection of the first object at 43a. At 44a, an input related to the selection of the first object is received. The image is then updated to indicate the input at 45a. At 46a, dimensional data related to one of the at least one object is computationally determined using the input.

In one embodiment, the image is updated to indicate an estimated perimeter around the first object when updating the image to indicate the selection of the first object. In one embodiment, the input (e.g., a user input manually entered by a user) selects a second object different than the first object. In another embodiment, the input modifies an aspect related to the indication of the selection of the first object. For example, in an embodiment, one aspect related to the indication of the selection of the first object may be an estimated perimeter of the first object as shown in the image, and accordingly the input may modify the estimated perimeter of the first object.

In some embodiments, the input may be a mark or a line drawn on, for example, a touch-screen device by a user to either validate the selection of the first object or to select a second object different than the first object. The input may also be a user input to point out corners of the first object in the image on, for example, a touch-screen device. When an estimated perimeter of the first object is also indicated in the image, the input may be a user input to correct a corner position of the estimated perimeter by moving a corner point of the first object in the image on, say, a touch-screen device. The estimated perimeter of the first object may be a draggable perimeter displayed on a display device and modifiable by a user dragging at least a portion of the estimated perimeter (e.g., in a click-and-drag or point-and-drag fashion) to change the estimated perimeter into a modified boundary that more closely resembles the real perimeter of the first object. Alternatively, the input may be a boundary line drawn by the user to indicate the selection of an object approximately surrounded by the line drawn by the user. As indicated previously, the input may be done by using the user's finger, a stylus or similar tool, by using a keyboard, or by using a computer mouse.

Accordingly, in one embodiment, the input received may be a user selection on a portion of a touch-screen device to select a second object of the at least one object. In another embodiment, the input received may be a boundary drawn on a touch-screen device around an image of a second object of the at least one object to select the second object that is different than the first object. In one embodiment, receiving an input may include detecting a number of contacts at a number of positions on a touch-screen device where the contacts indicate a number of corners of the first object. In a different embodiment, the received input may include at least one user input indicative of a new position of a corner of the first object in the image displayed on a touch-screen device. Alternatively, the received input may include at least one user input indicative of a perimeter of one of the at least one object on a touch-screen device indicative of a selection of the selected object.

In one embodiment, determining dimensional data related to one of the at least one object using the input may include determining a dimensional weight of the one of the at least one object based on a computationally determined estimated perimeter of the one of the at least one object. For instance, when the user input confirms the initial selection of the first object by a computing system, the computing system will determine the dimensional weight of the first object based on the estimated perimeter as determined by the computing system. In an alternative embodiment, determining dimensional data related to one of the at least one object using the input may include determining a dimensional weight of the one of the at least one object based on a user identified perimeter of the one of the at least one object. For example, when the user input modifies an estimated perimeter of the first object as determined by the computing system, the computing system determines the dimensional weight of the first object based on the modified perimeter. If the user input instead selects a second object that is not the first object, the computing system may determine the dimensional weight of the user-selected second object based on an estimated perimeter of the second object as determined by the computing system or based on a user-identified perimeter of the second object.

It should be appreciated by one skilled in the art that the process 40a may be implemented in one integrated device or in multiple standalone devices. For example, the process 40a may be implemented in any of the computing system 10a, 10b, and 10c of FIGS. 1A-1C, and the process 40a may be implemented in the electronic device 20a of FIG. 2A or in the electronic device 20b or FIG. 2B.

Figure 4B:
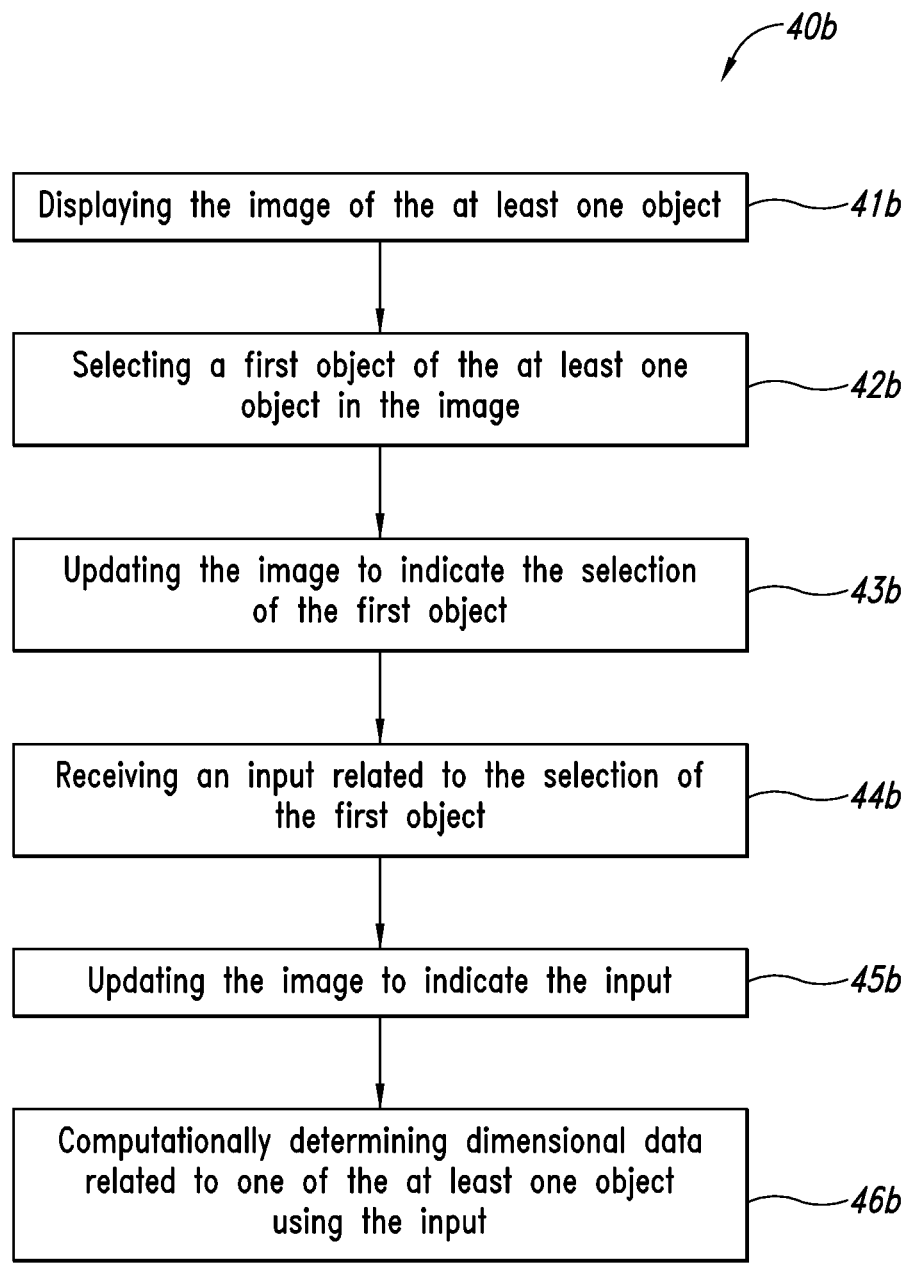
FIG. 4B is a flow chart showing a processor-implemented method of selecting an object from at least one object in an image to process information about the selected object according to another non-limiting illustrated embodiment.

FIG. 4B shows a flow chart of a process 40b of selecting an object from at least one object in an image to process information about the selected object according to one non-limiting illustrated embodiment. In one embodiment, at 41b, the image of the at least one object is displayed. At 42b, a first object of the at least one object in the image is selected. For example, a processor-based system or a computing system executing the process 40b may be configured to automatically select the first object of the at least one object in the image without any human interaction. The image is updated to indicate the selection of the first object at 43b. At 44b, an input related to the selection of the first object is received. The image is updated to indicate the input at 45b. In one embodiment, the process 40b may further computationally determine dimensional data related to one of the at least one object using the input at 46b.

As with the process 40a, the process 40b may be implemented in one integrated device or in multiple standalone devices. For example, the process 40b may be implemented in any of the computing system 10a, 10b, and 10c of FIGS. 1A-1C, and the process 40b may be implemented in the electronic device 20a of FIG. 2A or in the electronic device 20b or FIG. 2B.

Figure 5A:
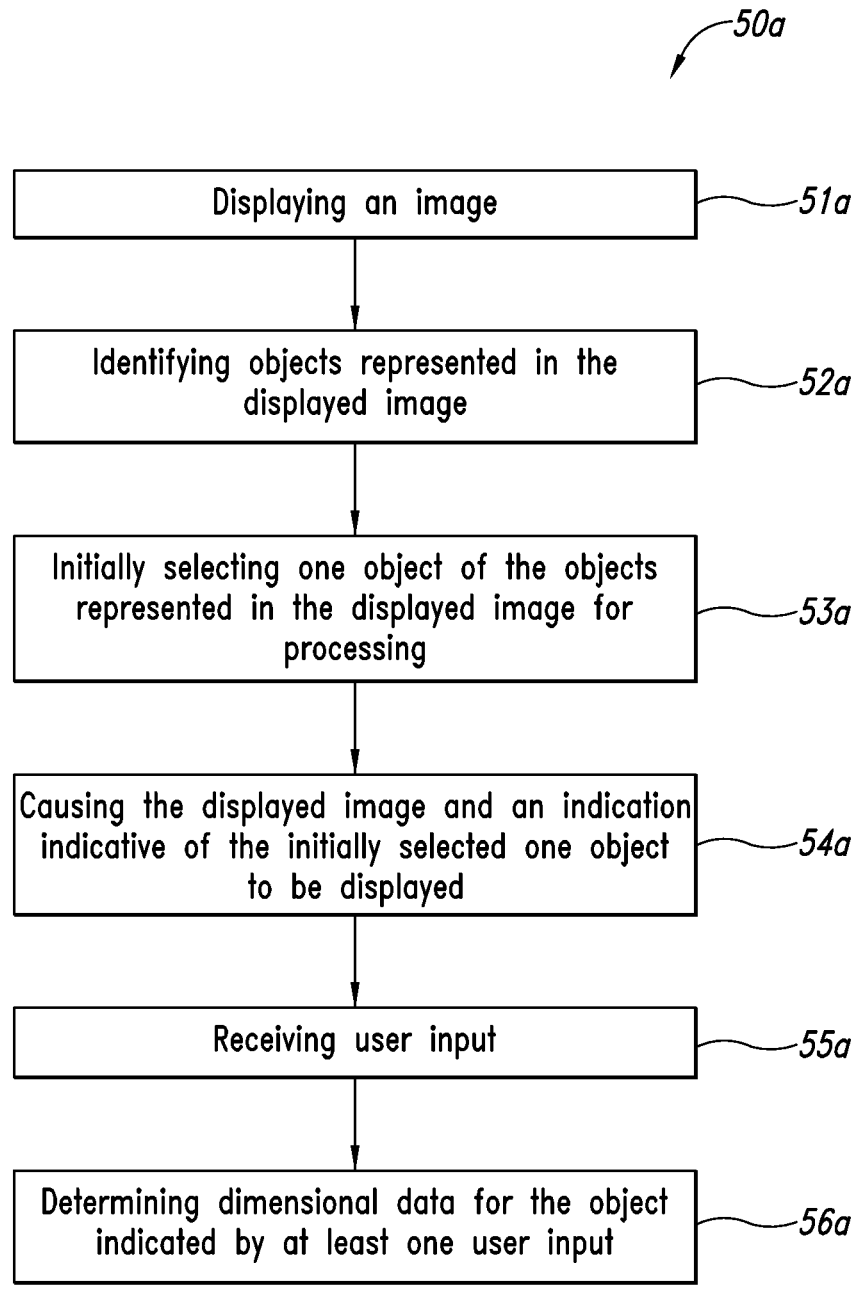
FIG. 5A is a flow chart showing a process performed by a program stored in a computer-readable medium according to one non-limiting illustrated embodiment.

FIG. 5A shows a flow chart of a process 50a performed by instructions (e.g., a computer-executable program) stored in a computer-readable medium according to one non-limiting illustrated embodiment. In one embodiment, the process 50a may be instructions in the form of a software program stored in a compact disc (CD), a memory device such as a universal serial bus (USB) memory device or a memory chip of a computing device. Accordingly, the process 50a may be executed by a device, such as a computer, that reads the instruction. In one embodiment, an image is displayed at 51a. At 52a, objects represented in the acquired image are identified. At 53a, one object of the objects represented in the acquired image is initially selected for processing. At 54a, the acquired image and an indication indicative of the initially selected one object are displayed. User input is received at 55a. At 56a, dimensional data for the object indicated by at least one user input is determined.

In one embodiment, determining dimensional data for the object indicated by at least one user input may include determining a dimensional weight based on an estimated perimeter of the initially selected one object as represented in the acquired image in response to at least one user input confirming the initially selected one object as the object to be processed. For example, when a user confirms the estimated perimeter of initially selected object A, the dimensional weight of object A is determined based on the estimated perimeter. Alternatively, determining dimensional data for the object indicated by at least one user input may include determining a dimensional weight based on a new perimeter of the initially selected one object represented in the acquired image in response to at least one user input indicative of the new perimeter. For example, when a user modifies an estimated perimeter of initially selected object A to form a new perimeter, the dimensional weight of object A is determined based on the new perimeter.

In one embodiment, determining dimensional data for the object indicated by at least one user input may include determining a dimensional weight based on an estimated perimeter of an object represented in the acquired image other than the initially selected one object in response to at least one user input selecting the other object as the object to be processed. For example, when the user selects object B, which is different than object A as initially selected by the computer-executable program, the dimensional weight of object B may be determined based on an estimated perimeter of object B as determined by the program. In another embodiment, determining dimensional data for the object indicated by at least one user input may include determining a dimensional weight based on a user identified perimeter of an object represented in the acquired image other than the initially selected one object in response to at least one user input selecting the other object as the object to be processed and identifying at least a portion of the user identified perimeter. For instance, when the user selects object B and identifies a user-identified perimeter of object B, the dimensional weight of object B may be determined based on the user-identified perimeter. The user-identified perimeter may also be displayed as a feedback to the user on a display of the acquired image to acknowledge the user input.

In one embodiment, causing the acquired image and an indication indicative of the initially selected one object to be displayed may include causing the acquired image to be displayed and causing a draggable border about at least a portion of the initially selected one object to be displayed in a display of the acquired image. In another embodiment, causing the acquired image and an indication indicative of the initially selected one object to be displayed may include causing the acquired image to be displayed and causing a draggable border about at least a portion of a user selected object to be displayed in a display of the acquired image. In either case, with the draggable border displayed, a user may drag the draggable border to make modifications to correct error in the displayed border.

Figure 5B:
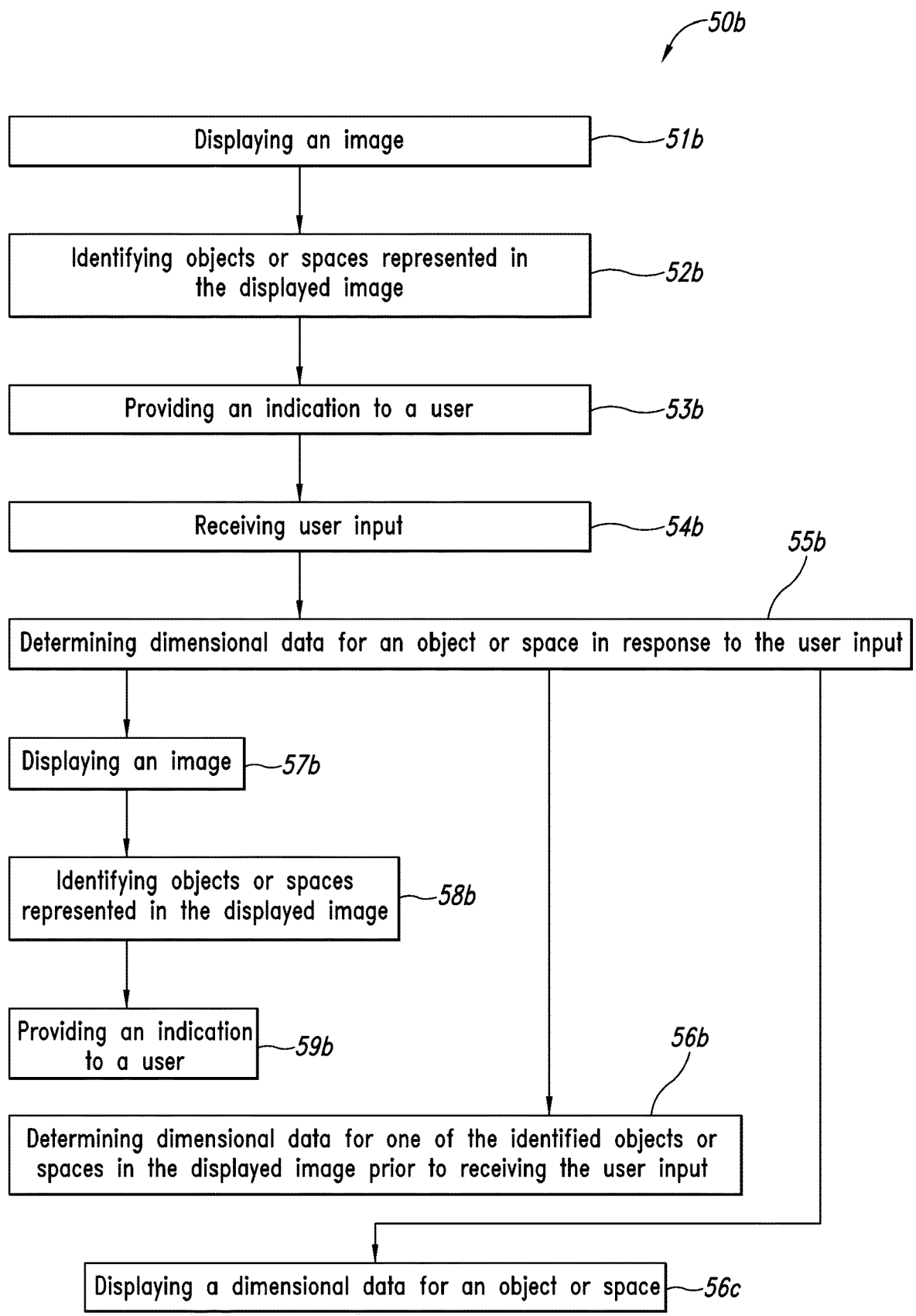
FIG. 5B is a flow chart showing a process performed by a program stored in a computer-readable medium according to another non-limiting illustrated embodiment.

FIG. 5B shows a flow chart of a process 50b. Similar to the process 50a, the process 50b may be performed by instructions (e.g., a computer-executable program) stored in a computer-readable medium according to one non-limiting illustrated embodiment. In one embodiment, the process 50*b* may be instructions in the form of a software program stored in a CD, a memory device such as a USB memory device or a memory chip of a computing device. Accordingly, the process 50*b* may be executed by a device, such as a computer, that reads the instruction. In one embodiment, an image is displayed at 51*b*. At 52*b*, objects or spaces represented in the displayed image are identified. At 53*b*, an indication is provided to a user. For example, an indication that one of the objects or spaces in the displayed image is automatically selected for further processing, e.g., to determine a dimensional data related to the selected object or space. User input is received at 54*b*. At 55*b*, dimensional data for an object or space is determined in response to the user input. For example, if the user input confirms the selection of the object or space, then dimensional data related to the selected object or space is determined. On the other hand, if the user input selects a different object or space than the one automatically selected, then dimensional data of the user selected object or space is determined. Alternatively, if the user input modifies an aspect related to the selection of the automatically selected object or space, such as the border of the object or space, then dimensional data of the automatically selected object or space is determined based on the user-modified border, for instance.

In one embodiment, the process 50*b* may further determine dimensional data for one of the identified objects or spaces in the displayed image prior to receiving the user input at 56*b*. In another embodiment, the process 50*b* may further display a dimensional data for an object or space. For example, a dimensional data, such as length, width, height, area, or volume, of the automatically selected object or space may be displayed before and/or after the user input is received. In yet another embodiment, at 57*b*, the process 50*b* may display a second image after receiving the user input. Objects or spaces represented in the second image are identified at 58*b*. Another user input is received at 59*b*.

Figure 6A:
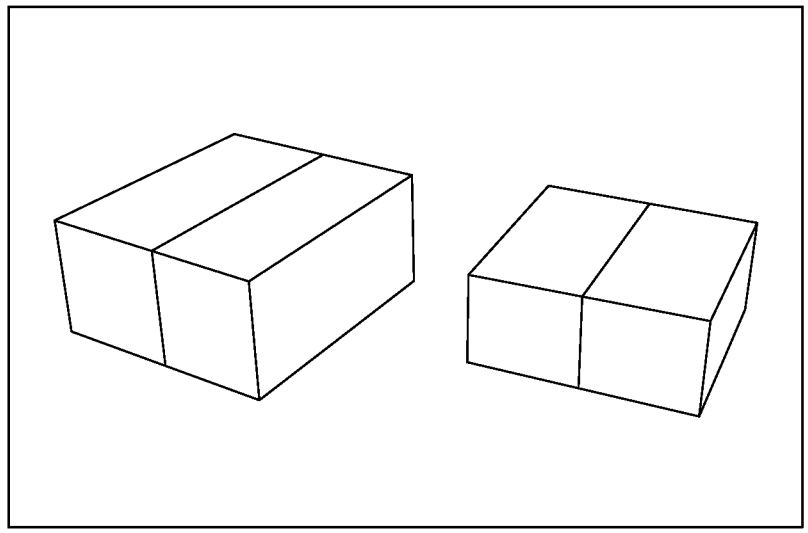
FIG. 6A is a diagram of an image of two objects according to one non-limiting illustrated embodiment.

FIG. 6A shows an image of two objects as taken by, for example, the imager 15 of the dimensioning system 10 or the imager 25 of the electronic device 20, according to one non-limiting illustrated embodiment. In this example, there are two objects, i.e., parcels, in the image.

Figure 6B:
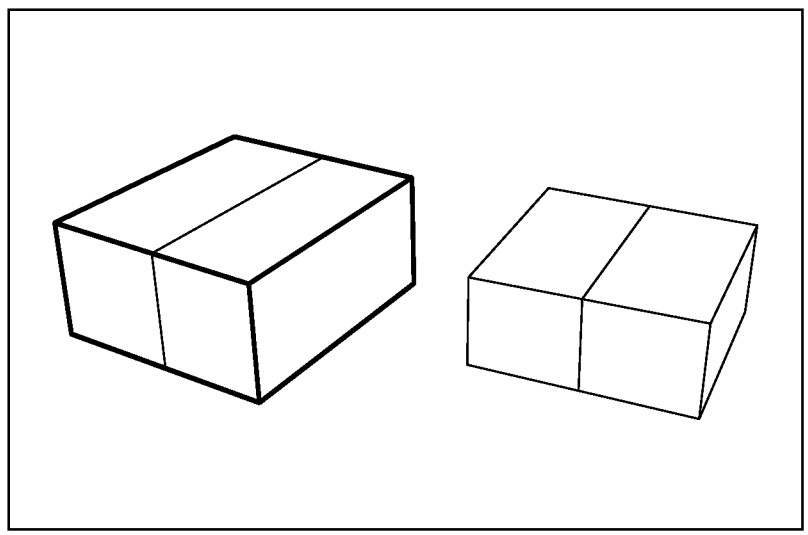
FIG. 6B is a diagram of the image of the two objects of FIG. 6A and an indication of the selection of one of the two objects according to one non-limiting illustrated embodiment.

FIG. 6B shows the image of the two objects of FIG. 6A and an indication of the selection of one of the two objects according to one embodiment. For example, after the computing system 12 of the dimensioning system 10 or the processing component 22 of the electronic device 20 automatically selects the parcel on the left in the image, the computing system 12 or the processing component 22 causes the selection of the parcel on the left to be shown in the image as well. This way, a user using the dimensioning system 10 or the electronic device 20 is informed of the automatic selection of the parcel on the left. In the example shown in FIG. 6B, the indication that the parcel on the left has been selected is presented as an estimated perimeter around the selected parcel. Further, the indication may also include lines showing the estimated edges of the selected parcel, as can be seen in FIG. 6B. The estimation of the perimeter and edges of a selected object is done by using pertinent algorithm with the image of the objects as known in the art.

Figure 6C:
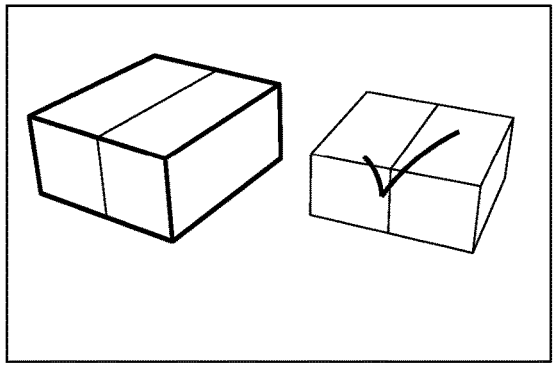
FIG. 6C is a diagram of the image of the two objects of FIG. 6A, an indication of the selection of one of the two objects, and an indication of a user selection of the other of the two objects according to one non-limiting illustrated embodiment.
Figure 6D:
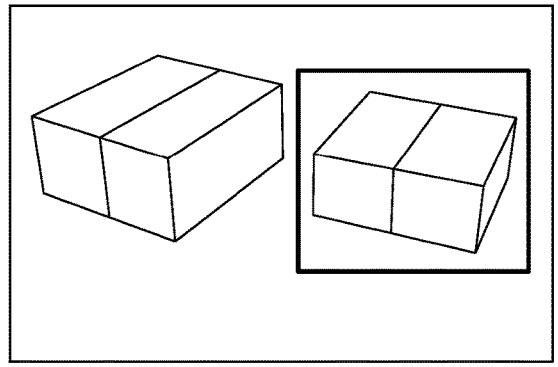
FIG. 6D is a diagram of the image of the two objects of FIG. 6A, an indication of the selection of one of the two objects, and an indication of a user selection of the other of the two objects according to another non-limiting illustrated embodiment.

FIG. 6C shows the image of the two objects of FIG. 6A, an indication that the parcel on the left has been automatically selected, and an indication of a user selection of the parcel on the right according to one embodiment. FIG. 6D shows the image of the two objects of FIG. 6A, an indication that the parcel on the left has been automatically selected, and an indication of a user selection of the parcel on the right according to another embodiment. In one embodiment, a user of the dimensioning system 10 or the electronic device 20 may override, or correct, the automatic selection by making a user input to select the parcel that should have been selected by the automatic process. The user may make such selection in one of many ways. For example, as shown in FIG. 6C, the user may draw a check mark on the desired object, i.e., the parcel on the right, with a stylus on the touch screen of, say, a handheld device to select the parcel on the right. Alternatively, the user may circle or box the parcel on the right with a stylus on the touch screen of the handheld device, as shown in FIG. 6D. The user may also make his/her selection by drawing a cross on the object of choice, placing a cursor on the object of choice and clicking on a computer mouse, or making selection via a keyboard, for example.

Figure 6E:
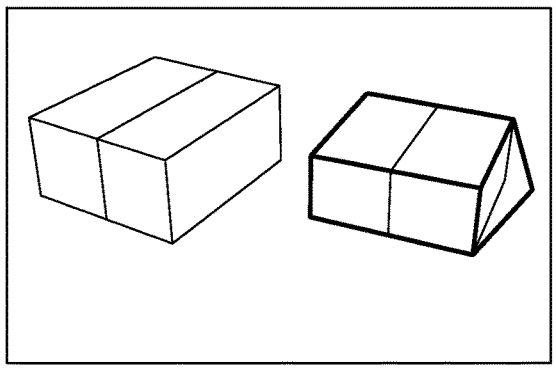
FIG. 6E is a diagram of an image of two objects and an indication of an estimated boundary of one of the two objects according to one non-limiting illustrated embodiment.
Figure 6F:
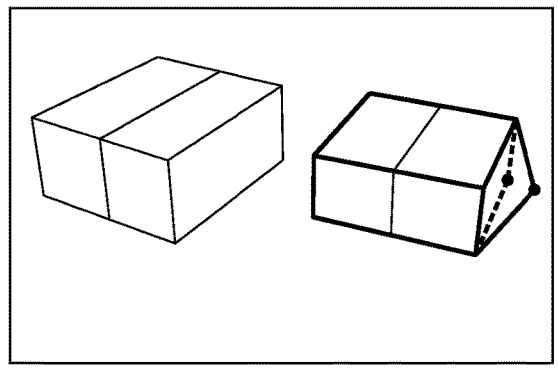
FIG. 6F is a diagram of the image of the two objects of FIG. 6E and an indication of a user modification of the estimated boundary of one of the two objects according to one non-limiting illustrated embodiment.

FIG. 6E shows an image of two parcels and an indication of an estimated perimeter of the parcel on the right according to one embodiment. In the example shown, the system did not correctly detect the borders of the selected object, i.e., the parcel on the right, and thus the estimated perimeter shown in the image is not entirely correct. This may be due to poor contrast as a result of insufficient lighting when the image was captured. FIG. 6F shows an example of a user modification of the estimated perimeter of the parcel on the right of FIG. 6E according to one embodiment. In one embodiment, the user may make the correction by selecting a corner and moving this corner to its proximate correct position. In an embodiment, the user may point directly the correct location, e.g., by tapping a touch screen with a stylus or the user's finger, to modify the perimeter. Alternatively, the user may approximately draw the correct borders of the object, either entirely or only where the estimation is incorrect, to make the correction.

Thus, systems and methods to allow user interaction in volume dimensioning an object are disclosed herein and should greatly improve upon the inaccuracy problem described above. For instance, when a dimensioning application selects an incorrect object for dimensioning or when the estimated perimeter of the selected object is erroneous, a user can intervene by selecting the correct object for dimensioning or by modifying the estimated perimeter. This user interaction provides a way for the user to validate or modify selections made by the application, and thereby avoid inaccuracies that might arise if the process is fully automated.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of volume dimensioning generally described above. It will be understood by those skilled in the art that, although the embodiments described above and shown in the figures are generally directed to the context of volume dimensioning, applications for determining other values related to objects, such as parcels and packages, may also benefit from the concepts described herein. Further, although the embodiments described above and shown in the figures are directed to volume dimensioning using a portable electronic device, the concepts and the embodiments described herein are equally applicable to non-portable devices or to a system having multiple standalone devices coupled to one.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dimensioning device, comprising:
   an imager having a field of view;
   a processor; and
   a memory including computer program code, the computer program code when executed by the processor, causes the dimensioning device to carry out the steps of:
   acquiring an image of the field of view;
   identifying each of a plurality of objects or spaces in the acquired image;
   selecting an initial one of an object or space from the plurality of identified objects or spaces, respectively;
   receiving user input data that identifies a selected one of the object or the space from the plurality of identified objects or spaces in the acquired image, wherein the user input data comprises an authentication of the initial one of the object or the space selected or a selection of a different object or space from the plurality of identified objects or spaces in the acquired image; and
   determining, using the processor, a dimensional weight of the selected one of the object or the space in response to the user input data.

2. The dimensioning device of claim 1, further comprising an input/output unit, wherein the processor causes the input/output unit to: send data to a display unit, and receive the user input data from the display unit.

3. The dimensioning device of claim 2, further comprising the display unit.

4. The dimensioning device of claim 2, wherein the display unit is remote from the dimensioning device.

5. The dimensioning device of claim 1, wherein the computer program code, when executed by the processor, further causes the dimensioning device to determine, in response to the user input data, the dimensional weight of the selected one of the object or the space based on an estimated perimeter.

6. The dimensioning device of claim 1, wherein the computer program code, when executed by the processor, further causes the dimensioning device to provide information related to the dimensional weight to a user.

7. A method of computing dimensional weight of an object or space using a dimensioning device, the method comprising:
   acquiring an image of a plurality of objects or spaces within field of view of an imager;
   identifying, using a processor, the plurality of objects or spaces in the acquired image;
   selecting, using the processor, an initial one of an object or space from plurality of identified objects or spaces, respectively;
   receiving user input data that identifies the selected one of the object or the space from the plurality of identified objects or spaces in the acquired image, wherein the user input data comprises an authentication of the initial one of the object or the space selected or a selection of a different object or space from the plurality of identified objects or spaces in the acquired image; and
   determining, using the processor, a dimensional weight of the selected one of the object or the space.

8. The method of claim 7, wherein determining the dimensional weight for the selected one of the object or the space further comprises determining the dimensional weight based on an estimated perimeter of the initial one of the object or the space as represented in the acquired image.

9. The method of claim 7, further comprising:
   providing an indication to an user, wherein the indication visually distinguishes selected one of the object or the space from the plurality of objects or spaces.

10. The method of claim 7, wherein determining the dimensional weight for the selected one of the object or the space further comprises computationally determining a dimension of at least one of an empty space, a box, a package, a parcel, a pallet, and a document represented in the acquired image.

11. A dimensioning system to determine dimensional information for spaces, the dimensioning system comprising:
    an imager to acquire images; and
    a non-transitory computer readable medium comprising a computer program code;
    a processor, wherein, when the computer program code is executed by the processor, the computer program code causes the processor to:
    identify one or more spaces in the acquired images;
    select an initial space from the one or more identified spaces;
    cause the acquired images to be displayed along with an indication of the selection of the initial space; and
    determine dimensional data for a selected space in response to received user input, wherein the user input comprises an authentication of the initial space selected or a selection of a different space from the one or more identified spaces in the acquired images.

12. The dimensioning system of claim 11, wherein the computer program code causes the processor to determine the dimensional data based on an estimated perimeter of the selected space in response to the user input comprising the authentication of the initial space selected.

13. The dimensioning system of claim 11, wherein the computer program code causes the processor to determine the dimensional data based on a new perimeter of the selected space in response to the user input comprising the selection of the different space.

14. The dimensioning system of claim 11, wherein the computer program code causes the processor to determine the dimensional data based on an estimated perimeter of the different space in the acquired image in response to the user input comprising the selection of the different space.

15. The dimensioning system of claim 11, wherein the computer program code causes the processor to determine the dimensional data based on a user identified perimeter of the different space represented in the acquired image in response to the user input comprising the selection of the different space and an identification of at least a portion of the user identified perimeter.

16. The dimensioning system of claim 11, wherein the computer program code causes the processor to cause acquired images to be displayed with an indication indicative of the selected space by displaying a draggable border about at least a portion of the initial space in the displayed acquired image.

17. The dimensioning system of claim 11, wherein the computer program code causes the processor to cause acquired images to be displayed along with an indication indicative of a user selected space by displaying a draggable border about at least a portion of the selected space in the displayed acquired image.

* * * * *